US012272886B2

(12) United States Patent
Liou et al.

(10) Patent No.: US 12,272,886 B2
(45) Date of Patent: Apr. 8, 2025

(54) ANTENNA DEVICE

(71) Applicant: IWAVENOLOGY CO., LTD., Kaohsiung (TW)

(72) Inventors: Chong-Yi Liou, Kaohsiung (TW); Wei-Ting Tsai, Kaohsiung (TW); Jin-Feng Neo, Kaohsiung (TW); Zheng-An Peng, Kaohsiung (TW); Tsu-Yu Lo, Kaohsiung (TW); Zhi-Yao Hong, Kaohsiung (TW); Tso-An Shang, Kaohsiung (TW); Je-Yao Chang, Kaohsiung (TW); Chien-Bang Chen, Kaohsiung (TW); Shih-Ping Huang, Kaohsiung (TW); Shau-Gang Mao, Kaohsiung (TW)

(73) Assignee: IWAVENOLOGY CO., LTD., Kaohsiung (TW)

( * ) Notice: Subject to any disclaimer, the term of this patent is extended or adjusted under 35 U.S.C. 154(b) by 103 days.

(21) Appl. No.: 17/953,895

(22) Filed: Sep. 27, 2022

(65) Prior Publication Data

US 2023/0125020 A1  Apr. 20, 2023

(30) Foreign Application Priority Data

Oct. 20, 2021 (TW) .................. 110212367

(51) Int. Cl.
*H01Q 9/16* (2006.01)
*H01Q 5/25* (2015.01)

(52) U.S. Cl.
CPC ............... *H01Q 9/16* (2013.01); *H01Q 5/25* (2015.01)

(58) Field of Classification Search
CPC ............ H01Q 1/38; H01Q 9/16; H01Q 13/10; H01Q 9/285
See application file for complete search history.

(56) References Cited

U.S. PATENT DOCUMENTS

| | | | |
|---|---|---|---|
| 7,119,745 B2* | 10/2006 | Gaucher | H01Q 9/26 343/846 |
| 7,453,402 B2* | 11/2008 | Rowell | H01Q 5/378 343/834 |
| 2009/0096676 A1* | 4/2009 | Yan | H01Q 9/285 430/323 |
| 2020/0106184 A1* | 4/2020 | Fabrega Sanchez | H01Q 9/285 |
| 2021/0066795 A1* | 3/2021 | Flores-Cuadras | H01Q 9/0407 |

* cited by examiner

*Primary Examiner* — Hasan Islam
(74) *Attorney, Agent, or Firm* — Birch, Stewart, Kolasch & Birch, LLP

(57) ABSTRACT

An antenna device includes a differential-line, a first metal and a second metal. The differential-line includes a first line and a second line. The first metal and second metal are coupled to the first line and second line respectively. The first metal and second metal have different shapes and/or different sizes. The first metal and second metal form symmetric or asymmetric dipole. The first metal and second metal can be disposed on the same plane or different planes, can be electrically insulated and can have a first slot and a second slot respectively. The antenna device can further include a base coupled to the first line and second line. The base can be a daughter board having a front-end module or not. The IC package in daughter board can have different sizes. The daughter board can be offset by different distances and can be coupled to a mother board.

11 Claims, 37 Drawing Sheets

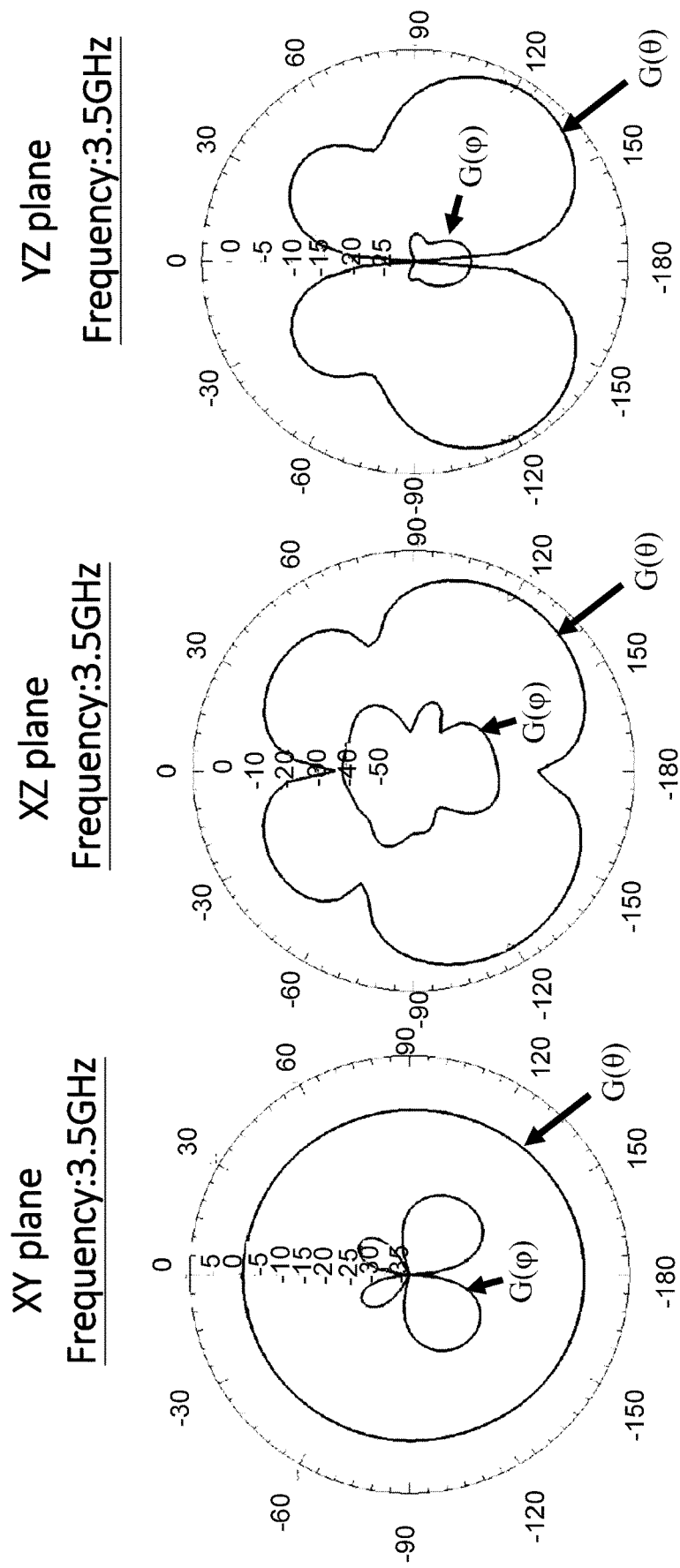

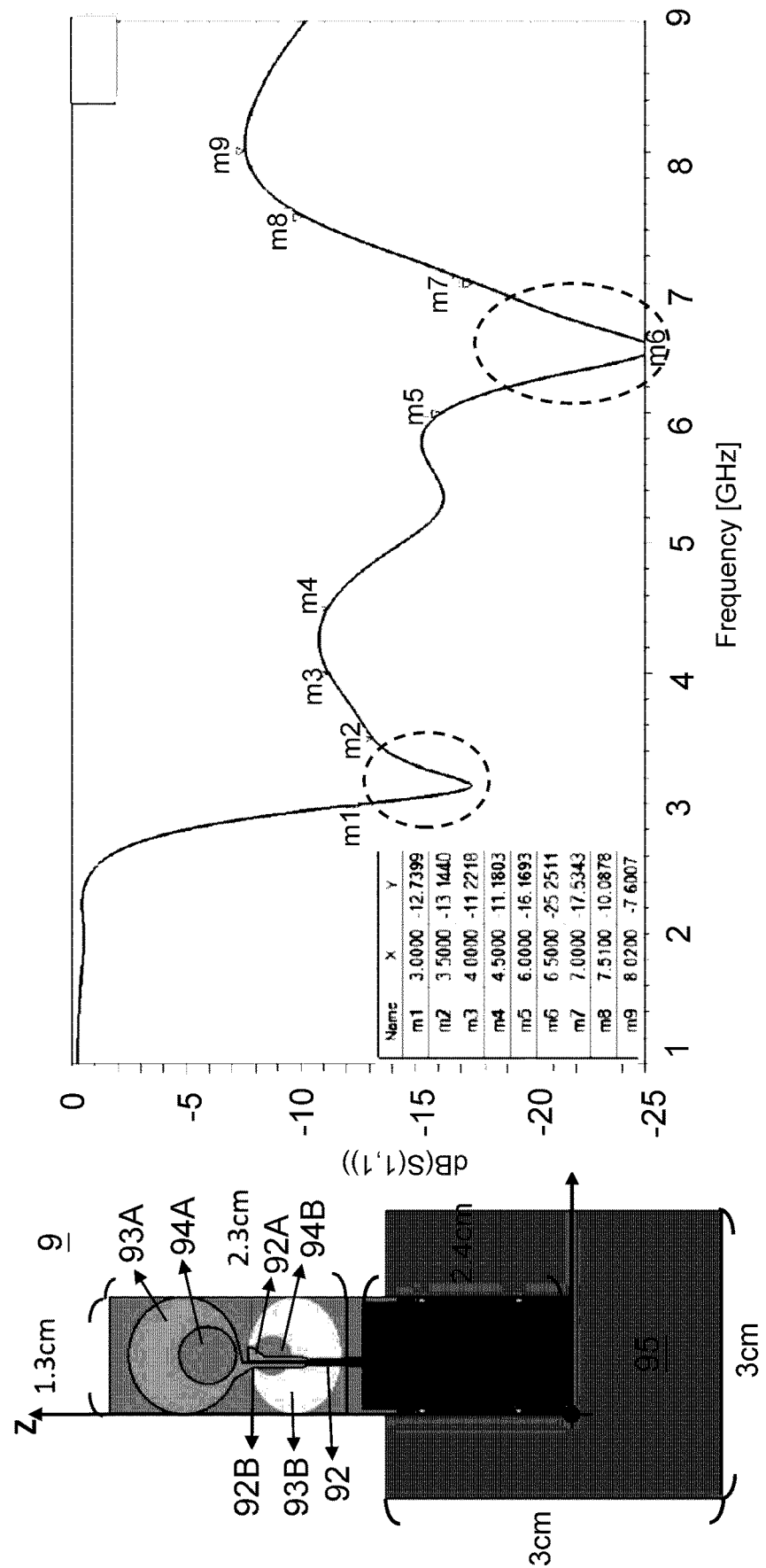

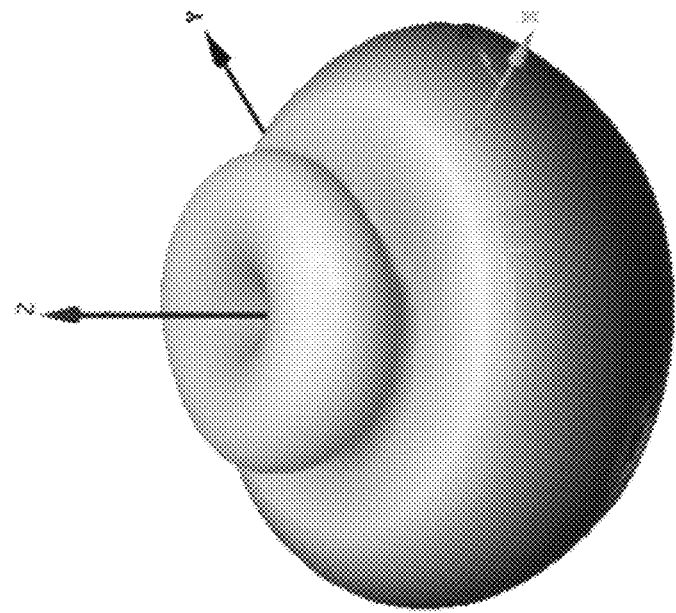
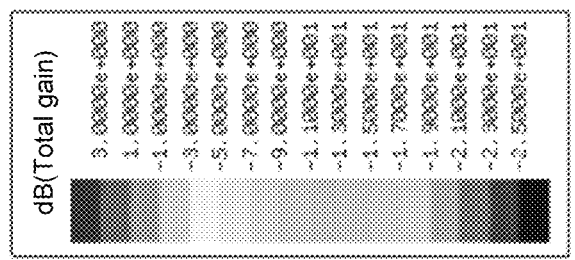
FIG. 17B
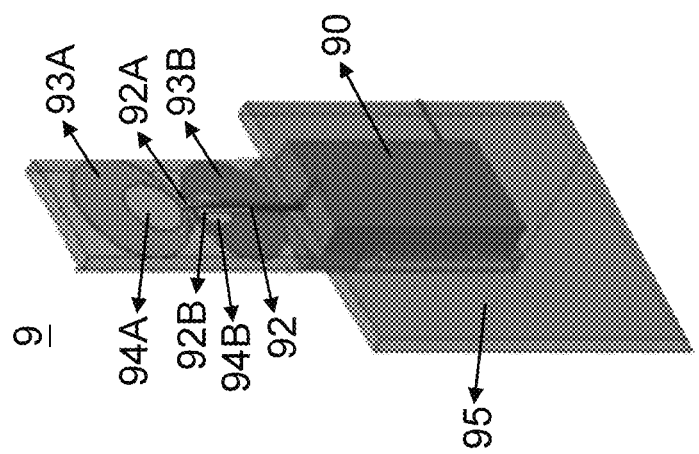
FIG. 17A

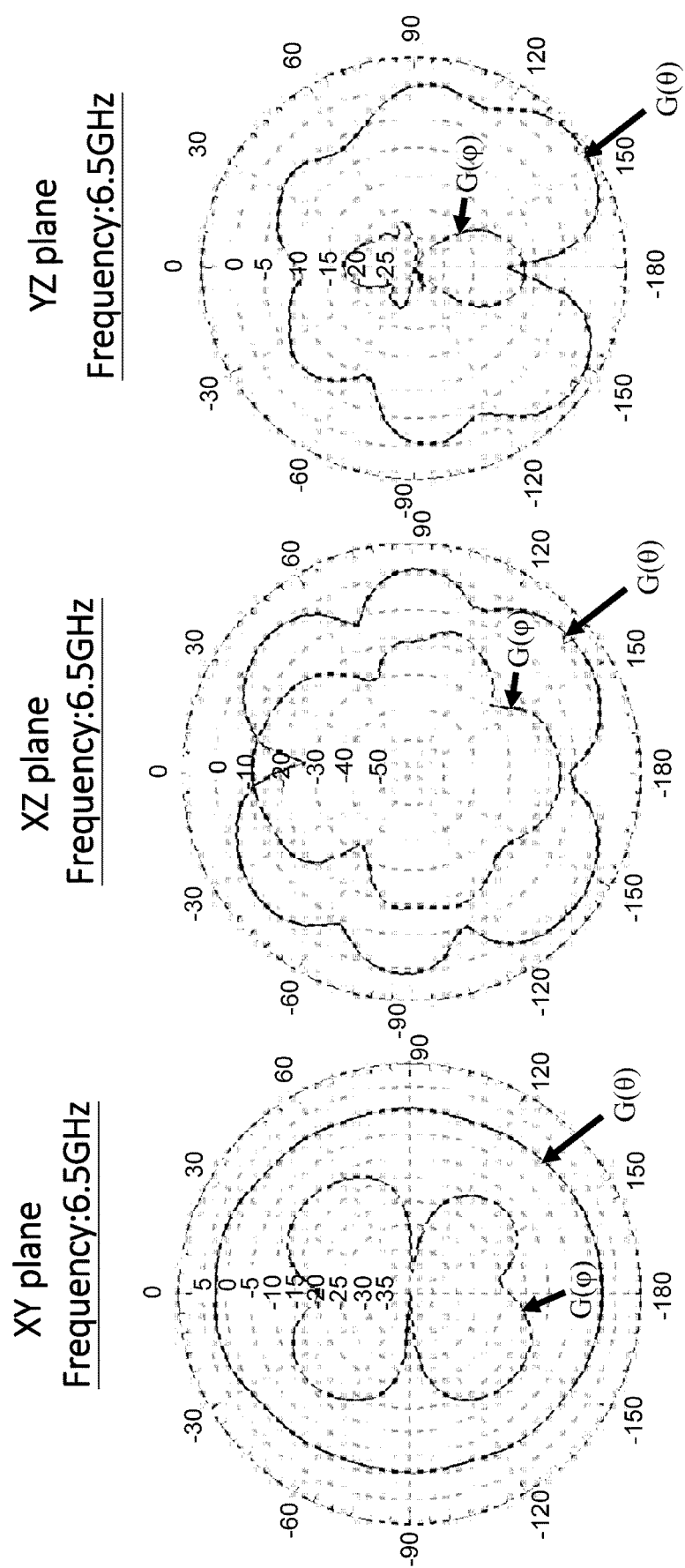

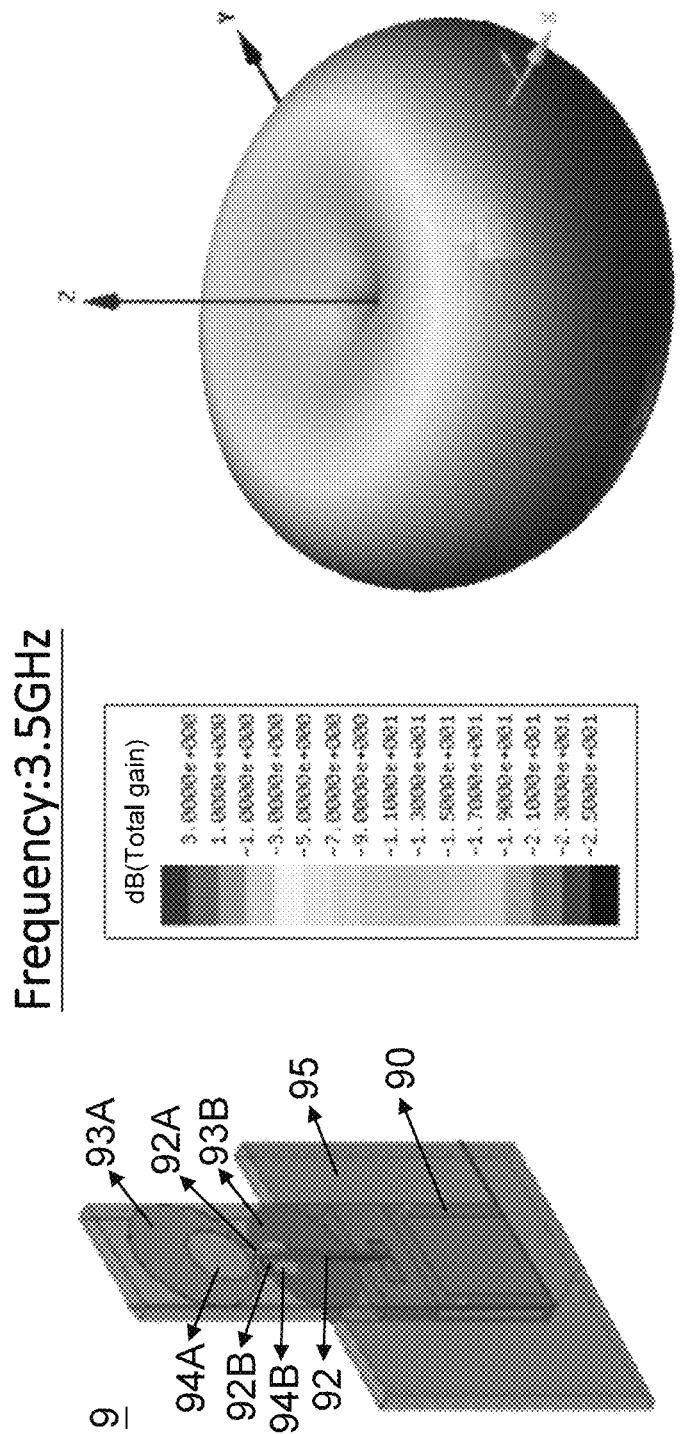

ANTENNA DEVICE

BACKGROUND OF THE INVENTION

1. Field of the Invention

The invention relates to an antenna; in particular, to an antenna device with a function of receiving ultra-wideband (UWB) wireless signal.

2. Description of the Prior Art

With the continuous development of the wireless positioning field, wireless positioning technology has been widely used in various mobile communication products used in daily life of users.

However, since various new types of wireless positioning applications (such as mobile payment, digital signage orientation, etc.) have strict requirements for high positioning accuracy, high security, and low power consumption, conventional mobile communication devices using wireless communication protocols such as Wi-Fi and Bluetooth to perform wireless positioning have been unable to meet the above strict requirements and needs to be further improved.

In recent years, the industry has begun to develop an ultra-wideband (UWB) wireless positioning technology. Because the ultra-wideband wireless signal has strong penetrating power, low power consumption, high security, low system complexity, and can provide centimeter-level positioning accuracy, it can be applied to the positioning tracking and navigation of indoor stationary or moving objects and people, and can provide accurate positioning information, which is quite worth looking forward to.

SUMMARY OF THE INVENTION

In view of this, the present invention proposes an antenna device with an ultra-wideband (UWB) wireless signal receiving function to effectively solve the above-mentioned problems encountered in the prior art.

A preferred embodiment of the invention is an antenna device. In this embodiment, the antenna device includes a differential-line, a first metal and a second metal. The differential-line includes a first line and a second line. The first metal and second metal are coupled to the first line and second line respectively. The first metal and second metal have different shapes and/or different sizes.

In an embodiment, the first metal and the second metal form a symmetric dipole.

In an embodiment, the first metal and the second metal form an asymmetric dipole.

In an embodiment, the first metal and the second metal are disposed on the same plane.

In an embodiment, the first metal and the second metal are disposed on different planes.

In an embodiment, the first metal and the second metal are electrically insulated.

In an embodiment, the first metal has a first slot.

In an embodiment, the first metal has no first slot.

In an embodiment, the second metal has a second slot.

In an embodiment, the second metal has no second slot.

In an embodiment, the antenna device further includes a base coupled to the first line and the second line.

In an embodiment, the base is a daughter board.

In an embodiment, the daughter board has a front-end module.

In an embodiment, the daughter board has no front-end module.

In an embodiment, an IC package in the daughter board has different sizes.

In an embodiment, the daughter board is offset by different distances.

In an embodiment, the daughter board is coupled to a mother board.

Compared to the prior art, the antenna device proposed in the invention is a symmetric dipole or asymmetric dipole antenna device with an ultra-wideband (UWB) wireless signal receiving function. Because the UWB wireless signal has the advantages of high positioning accuracy (centimeter level), high security, low power consumption, etc., it can be applied to various new types of wireless positioning applications (such as mobile payment, digital signage orientation, etc.) and provides good wireless positioning function to effectively solve the problems encountered by the previous technology.

The advantage and spirit of the invention may be understood by the following detailed descriptions together with the appended drawings.

BRIEF DESCRIPTION OF THE APPENDED DRAWINGS

FIG. 11A to FIG. 11C illustrate 2-D radiation patterns obtained according to the antenna device of FIG. 9B at a frequency of 3.5 GHz.

FIG. 16A illustrates an embodiment of the antenna device including a (5 mm*5 mm IC packaged) daughter board having front-end module and a mother board.

FIG. 16B illustrates a graph of impedance bandwidth obtained according to the antenna device of FIG. 16A.

FIG. 17A illustrates a 3-D schematic diagram of the antenna device of FIG. 16A.

FIG. 17B illustrates a 3-D radiation pattern obtained according to the antenna device of FIG. 16A at a frequency of 3.5 GHz.

FIG. 22A to FIG. 22C illustrate 2-D radiation patterns obtained according to the antenna device of FIG. 16A at a frequency of 6.5 GHz.

FIG. 24A illustrates a 3-D schematic diagram of the antenna device of FIG. 23A.

FIG. 24B illustrates a 3-D radiation pattern obtained according to the antenna device of FIG. 23A at a frequency of 3.5 GHz.

DETAILED DESCRIPTION OF THE INVENTION

Figure 2A:
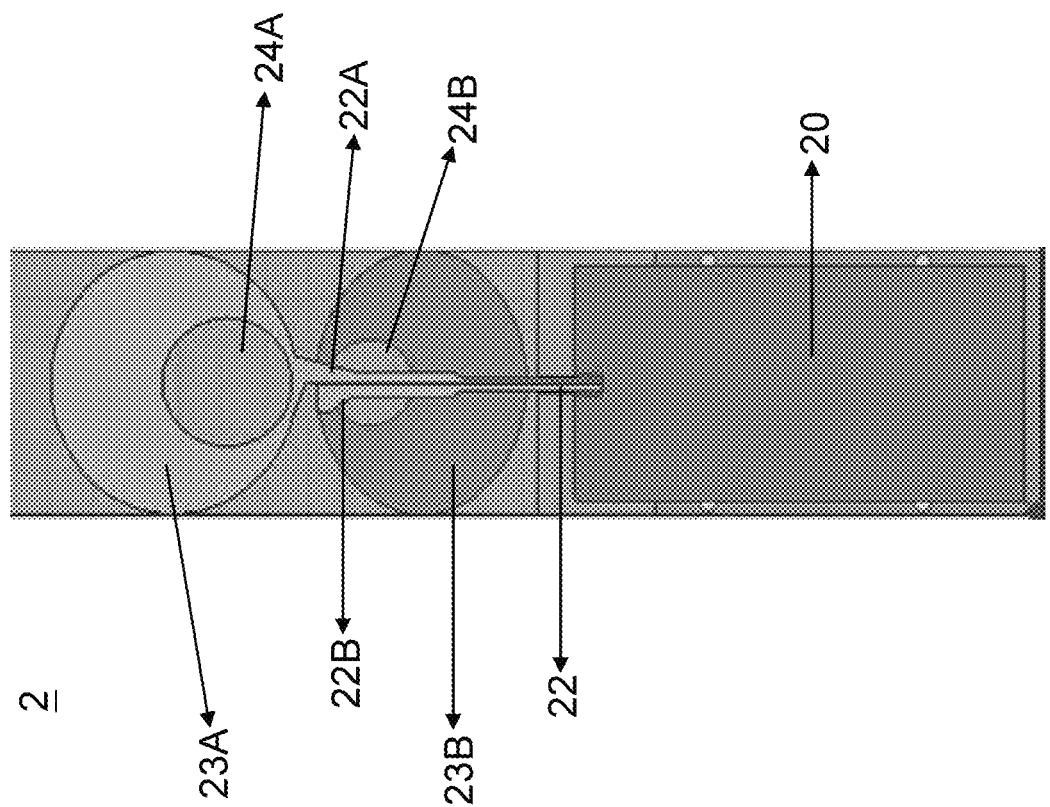
FIG. 2A illustrates a schematic diagram of the antenna device in an embodiment of the invention.

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment of the invention is an antenna device. In this embodiment, the antenna device is a symmetric dipole or an asymmetric dipole antenna device with an ultra-wideband (UWB) wireless signal receiving function, which can be used to receive UWB signals, but not limited to this.

Figure 1:
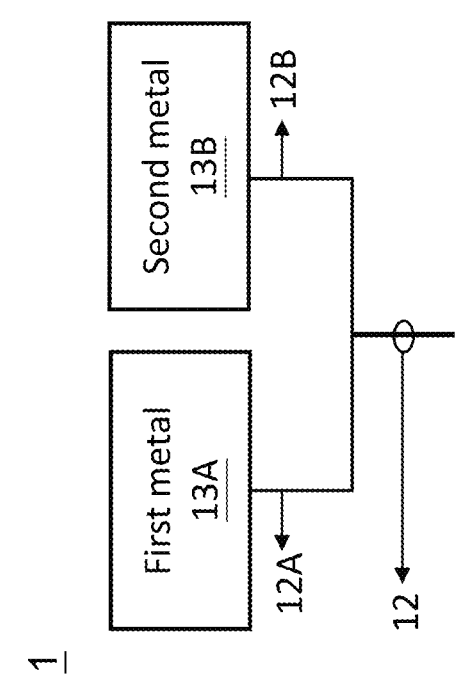
FIG. 1 illustrates a functional block diagram of the antenna device of the invention.

Please refer to FIG. 1. FIG. 1 illustrates a functional block diagram of the antenna device of the invention. As shown in FIG. 1, the antenna device 1 includes a differential line 12, a first metal 13A and a second metal 13B. The differential line 12 includes a first line 12A and a second line 12B. The first metal 13A and the second metal 13B are respectively coupled to the first line 12A and the second line 12B.

It should be noted that the shapes and/or sizes of the first metal 13A and the second metal 13B of the antenna device 1 of the invention are different. That is to say, in the antenna device 1 of the invention, the shapes of the first metal 13A and the second metal 13B are different, the sizes of the first metal 13A and the second metal 13B are different, or the first metal 13A and the second metal 13B are different in both shape and size.

Please refer to FIG. 2A. FIG. 2A illustrates a schematic diagram of the antenna device in an embodiment of the invention. As shown in FIG. 2A, the antenna device 2 includes a base 20, a differential line 22, a first metal 23A and a second metal 23B. The differential line 22 includes a first line 22A and a second line 22B. The first metal 23A is coupled to the base 20 through the first line 22A. The second metal 23B is coupled to the base 20 through the second line 22B. The shapes and/or sizes of the first metal 23A and the second metal 23B are different, but not limited to this.

In this embodiment, the first metal 23A and the second metal 23B form an asymmetric dipole, wherein the first metal 23A has a first circular slot 24A disposed therein and the second metal 23B has a second circular slot 24B disposed therein, and the sizes of the first circular slot 24A and the second circular slot 24B are different. The shapes and sizes of the first metal 23A and the second metal 23B can be the same or different from each other. The shapes and sizes of the first slot 24A and the second slot 24B can be the same or different from each other.

In practical applications, the first metal 23A and the second metal 23B can be formed of the same or different metal materials, but not limited to this; the first metal 23A and the second metal 23B can be disposed on the same plane or on different planes, but not limited to this; the first metal 23A and the second metal 23B can be electrically insulated from each other, but not limited to this; the first metal 23A and the second metal 23B can have a slot or not, but not limited to this.

It should be noted that the antenna device 2 can include the base 20 or not. The shape and size of the base 20 can be determined according to actual needs, and there are no special restrictions. The base 20 can be, but not limited to, a circuit board (e.g., a daughter board). A plurality of connection ports can be disposed in the base 20. The plurality of connection ports can be coupled to capacitors and/or inductors. The first metal 23A can be electrically connected to the plurality of connection ports in the base 20 through the first line 22A; the second metal 23B can be electrically connected to the plurality of connection ports in the base 20 through the second line 22B, but not limited to this.

In fact, the antenna device 2 can complete impedance matching by changing the shape of the first metal 23A/the second metal 23B or changing the manner in which the plurality of connection ports disposed in the base 20 are coupled to capacitors and inductors, such as the antenna device 2 can complete impedance matching by means of a series inductance and a parallel capacitor, or use a series capacitor and a parallel inductance, or a single series inductance/capacitor, or a single parallel inductance/capacitor to complete impedance matching, but not limited to this.

Figures 2B, 2C:
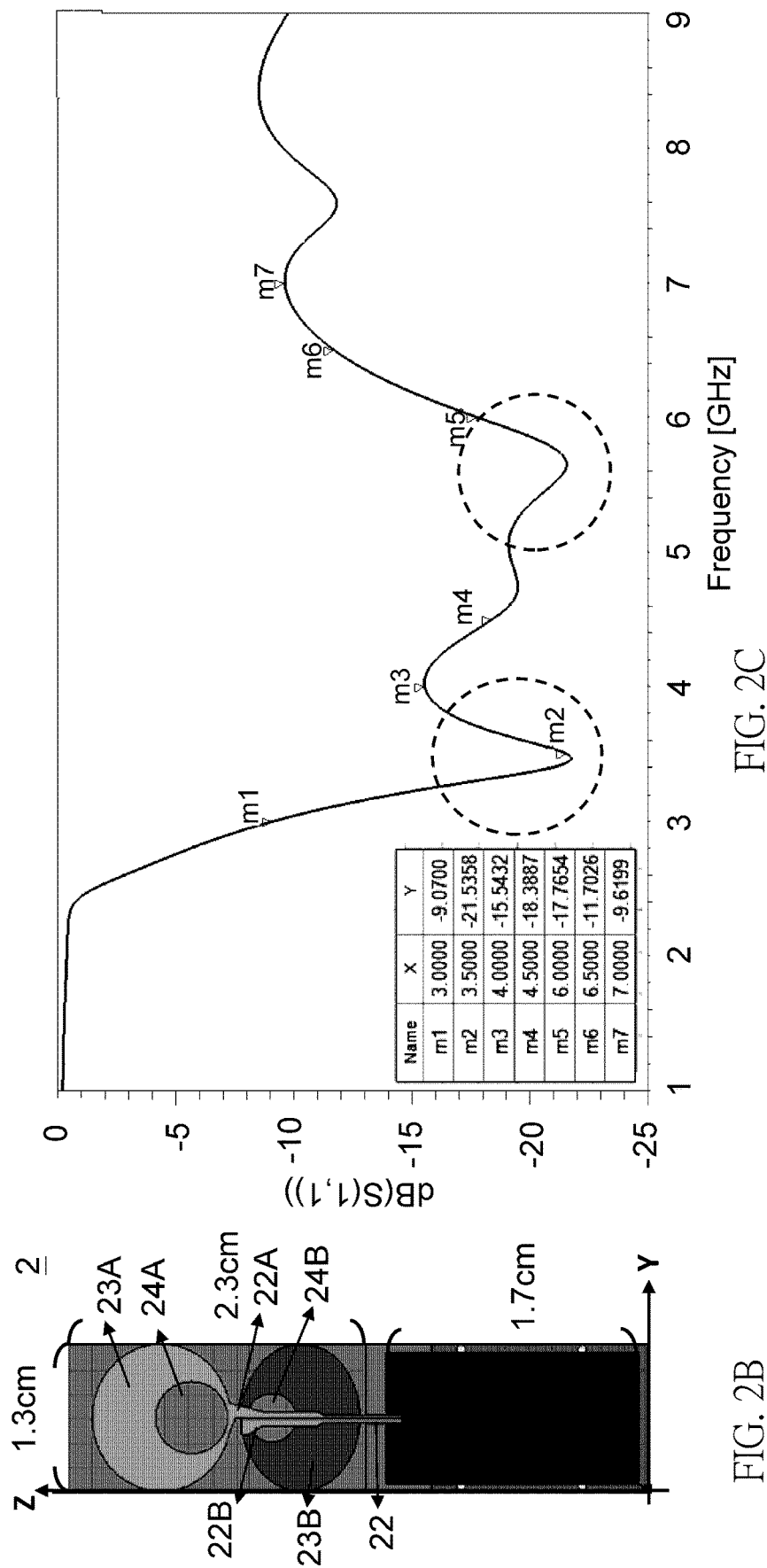
FIG. 2B illustrates an embodiment that the base of the antenna device is a daughter board having no front-end module.
FIG. 2C illustrates a graph of impedance bandwidth obtained according to the antenna device of FIG. 2B.

Please refer to FIG. 2B and FIG. 2C. FIG. 2B shows an embodiment that the base 20 of the antenna device 2 is a daughter board having no front-end module. FIG. 2C illustrates a graph of impedance bandwidth obtained according to the antenna device of FIG. 2B. As shown in FIG. 2C, according to the 2-D coordinates of the 2-D coordinate points m1~m7 on the curve, the distribution of the impedance bandwidth can be known, but not limited to this.

Next, simulation results such as a 3-D radiation pattern and a 2-D radiation pattern obtained by the antenna device of FIG. 2B at different frequencies will be introduced respectively.

Figure 3:
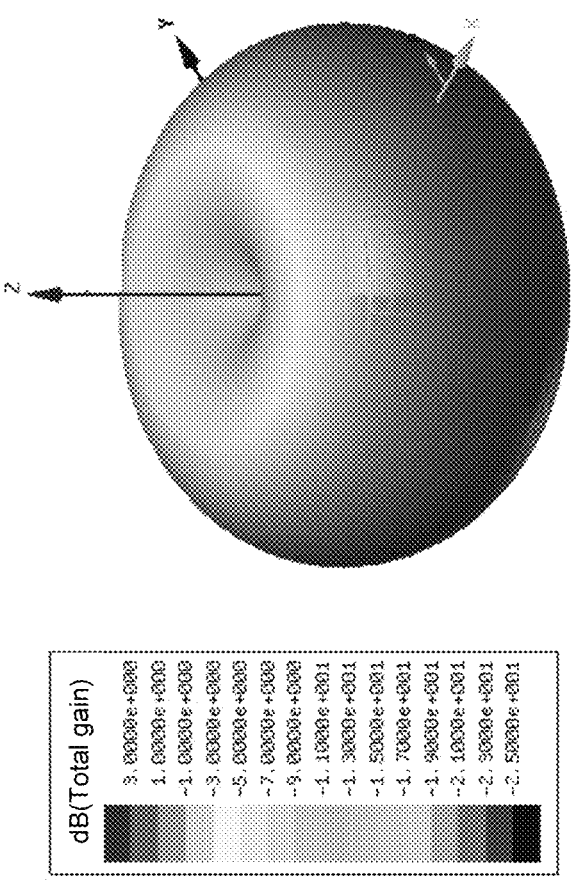
FIG. 3 illustrates a 3-D radiation pattern obtained according to the antenna device of FIG. 2B at a frequency of 3.5 GHz.
Figures 4A, 4B, 4C:
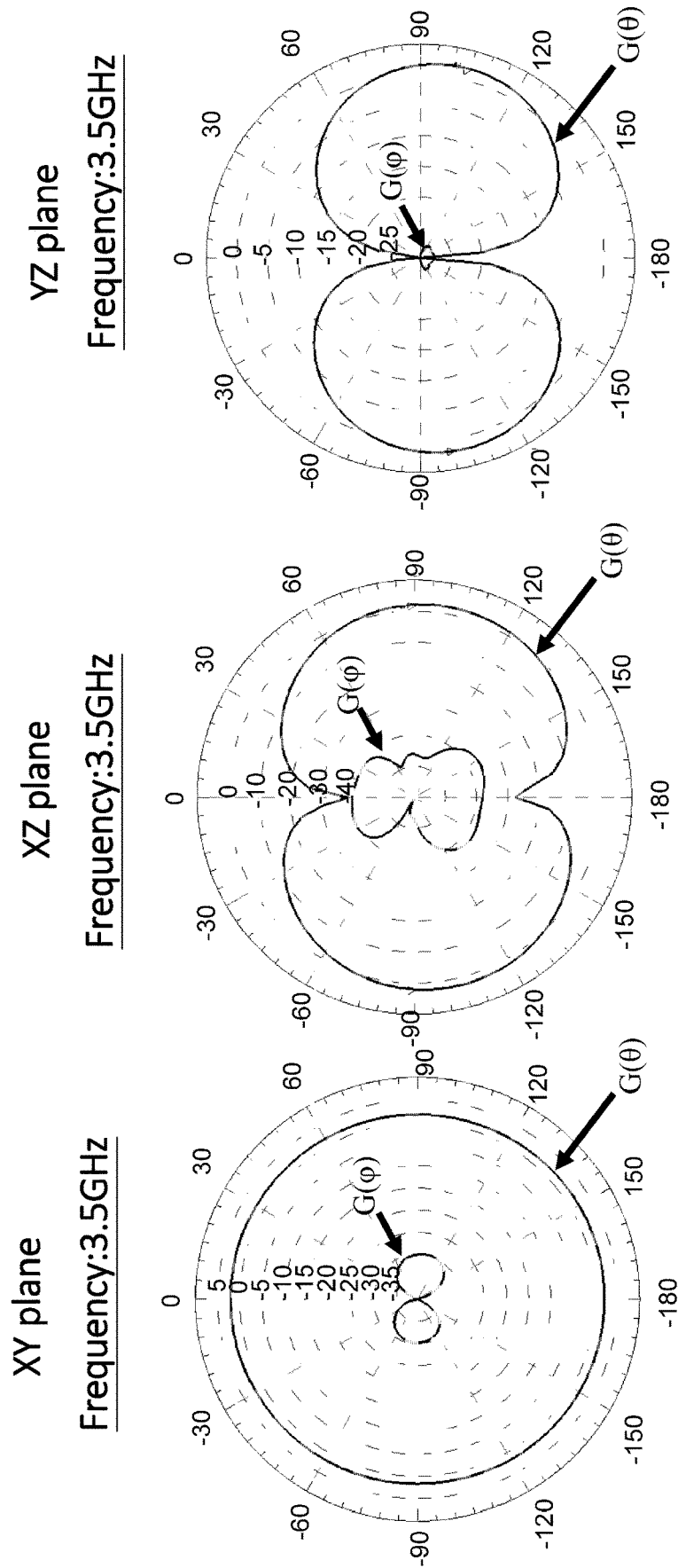
FIG. 4A to FIG. 4C illustrate 2-D radiation patterns obtained according to the antenna device of FIG. 2B at a frequency of 3.5 GHz.

Please refer to FIG. 3 and FIG. 4A to FIG. 4C. FIG. 3 illustrates a 3-D radiation pattern obtained according to the antenna device of FIG. 2B at a frequency of 3.5 GHz. FIG. 4A to FIG. 4C illustrate 2-D (XY plane, XZ plane, YZ plane) radiation patterns obtained according to the antenna device of FIG. 2B at a frequency of 3.5 GHz. According to FIG. 3 and FIG. 4A to FIG. 4C, the simulation results of the 3-D and 2-D radiation directions obtained according to the antenna device of FIG. 2A at the frequency of 3.5 GHz are generally good, but not limited to this.

Figure 5:
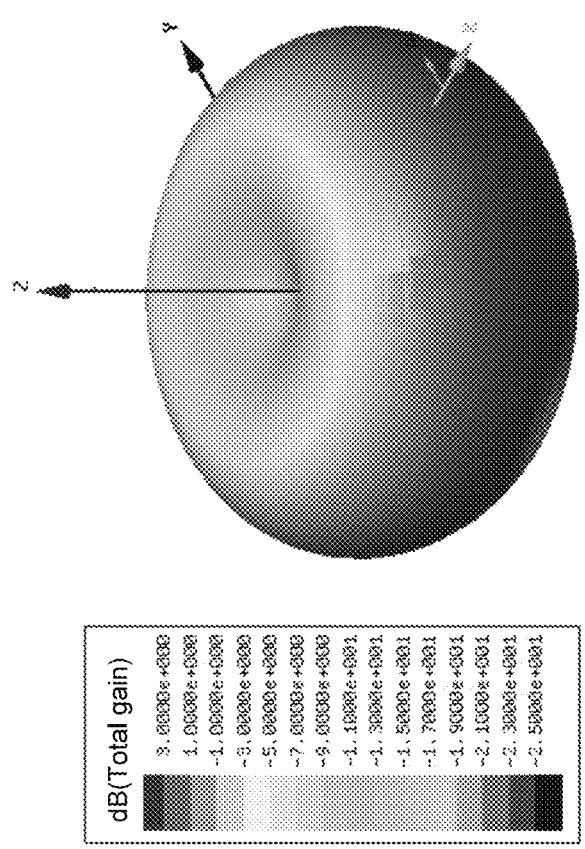
FIG. 5 illustrates a 3-D radiation pattern obtained according to the antenna device of FIG. 2B at a frequency of 4 GHz.
Figure 6:
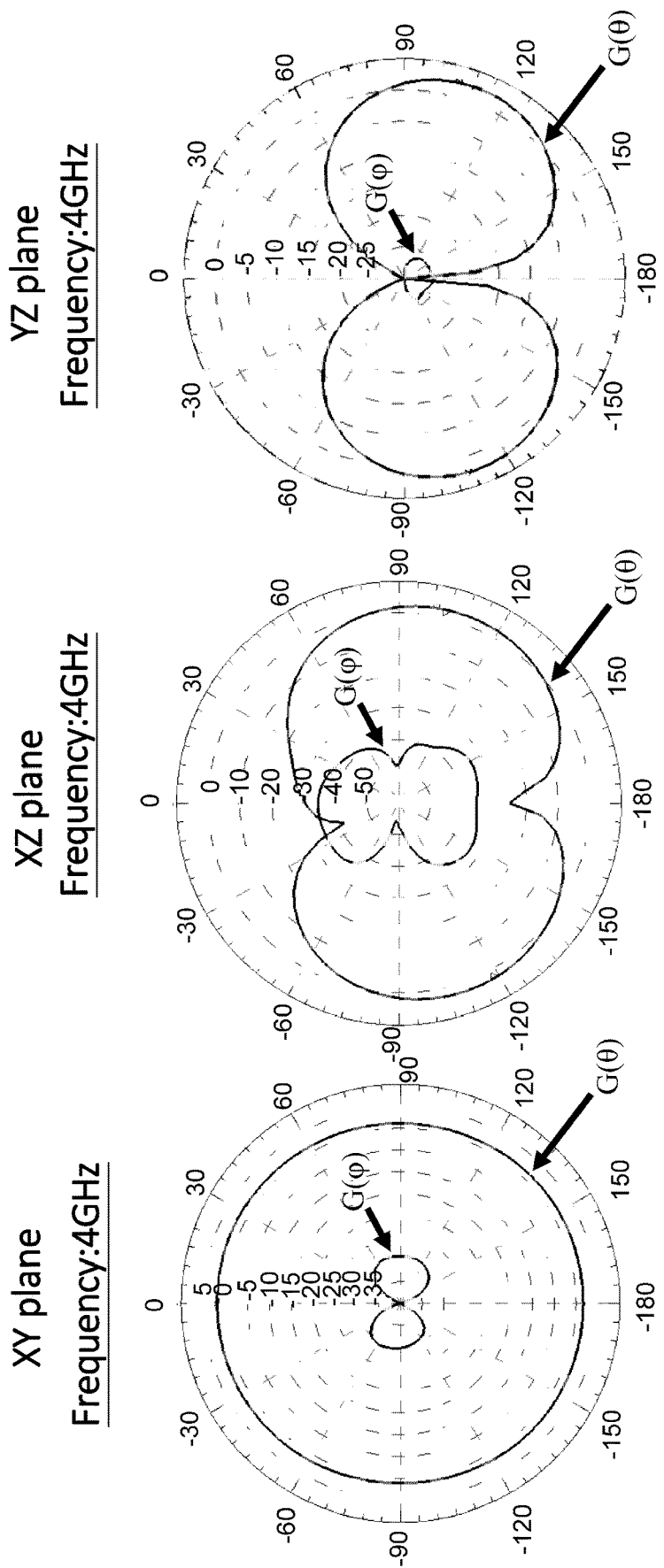
FIG. 6A to FIG. 6C illustrate 2-D radiation patterns obtained according to the antenna device of FIG. 2B at a frequency of 4 GHz.

Please refer to FIG. 5 and FIG. 6A to FIG. 6C. FIG. 5 illustrates a 3-D radiation pattern obtained according to the antenna device of FIG. 2B at a frequency of 4 GHz. FIG. 6A to FIG. 6C illustrate 2-D radiation patterns obtained according to the antenna device of FIG. 2B at a frequency of 4 GHz. According to FIG. 5 and FIG. 6A to FIG. 6C, the simulation results of the 3-D and 2-D radiation directions obtained according to the antenna device of FIG. 2B at the frequency of 4 GHz are generally good, but not limited to this.

Figure 7:
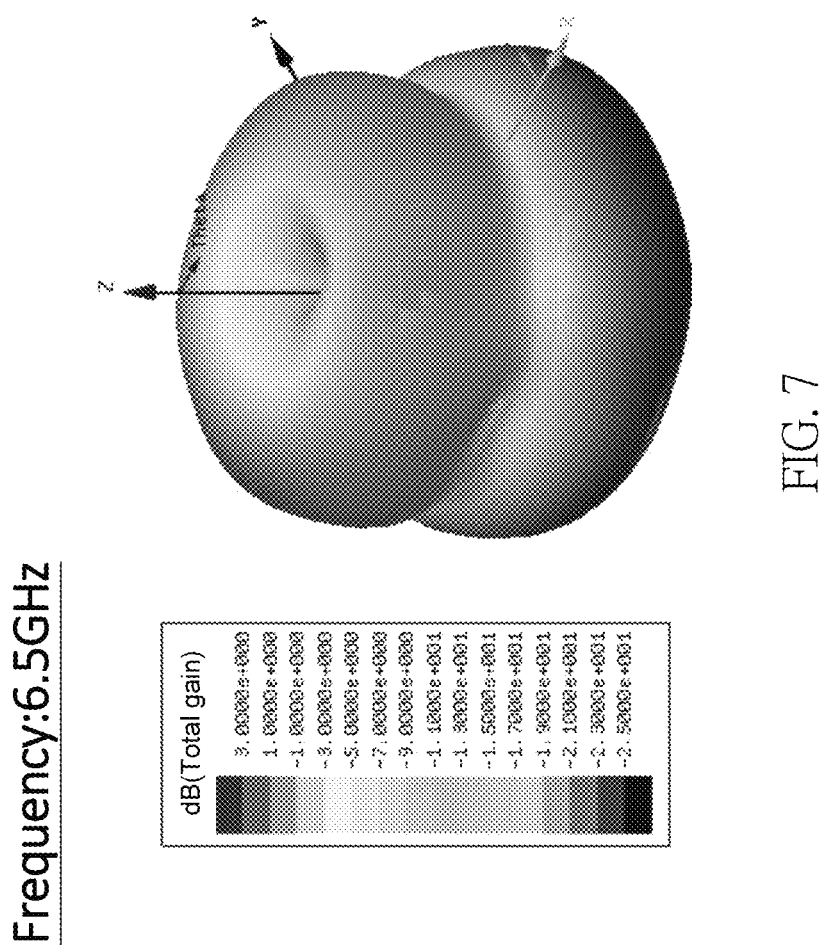
FIG. 7 illustrates a 3-D radiation pattern obtained according to the antenna device of FIG. 2B at a frequency of 6.5 GHz.
Figures 8A, 8B, 8C:
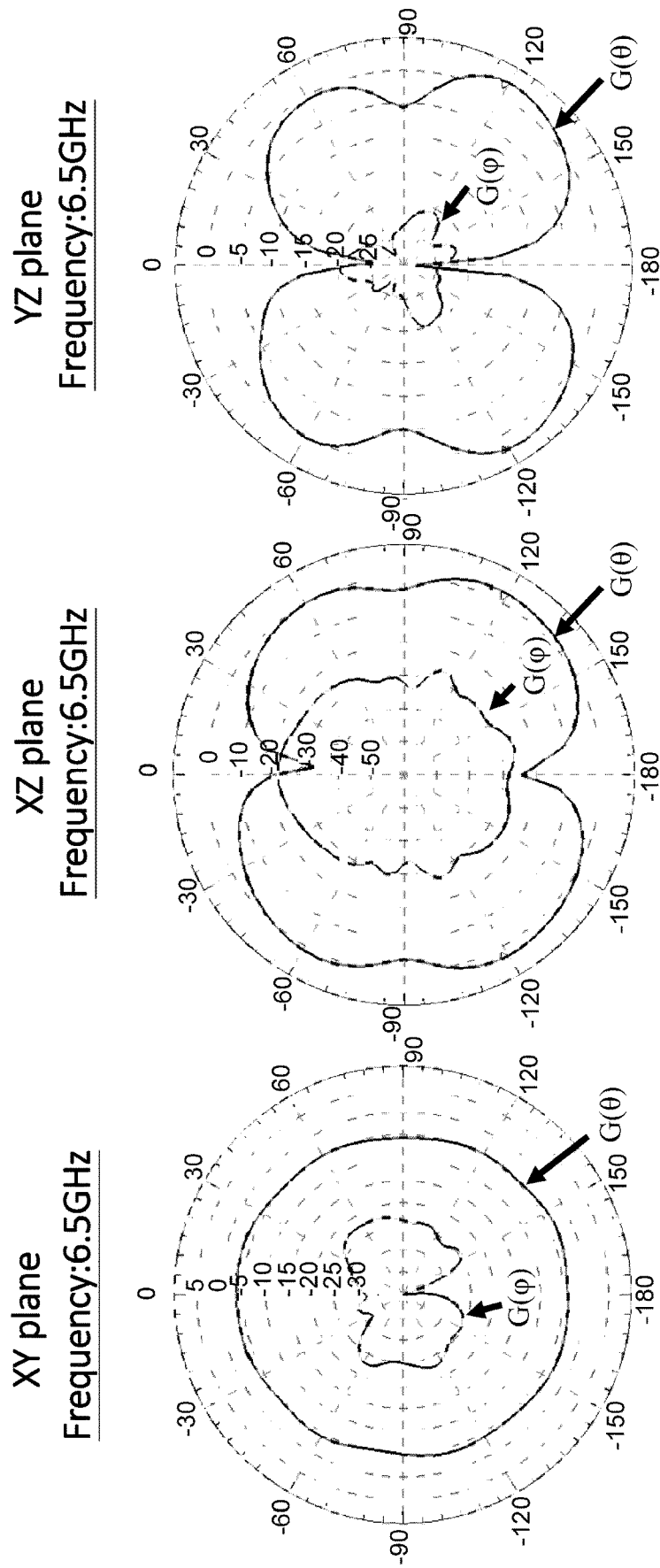
FIG. 8A to FIG. 8C illustrate 2-D radiation patterns obtained according to the antenna device of FIG. 2B at a frequency of 6.5 GHz.

Please refer to FIG. 7 and FIG. 8A to FIG. 8C. FIG. 7 illustrates a 3-D radiation pattern obtained according to the antenna device of FIG. 2B at a frequency of 6.5 GHz. FIG. 8A to FIG. 8C illustrate 2-D radiation patterns obtained according to the antenna device of FIG. 2B at a frequency of 6.5 GHz. According to FIG. 7 and FIG. 8A to FIG. 8C, it can be seen that the simulation results of the 3-D and 2-D radiation directions obtained by the antenna device of FIG. 2B at the higher frequency of 6.5 GHz are worse than those obtained at a lower frequency (3.5 GHz or 4 GHz), but not limited to this.

Figure 9A:
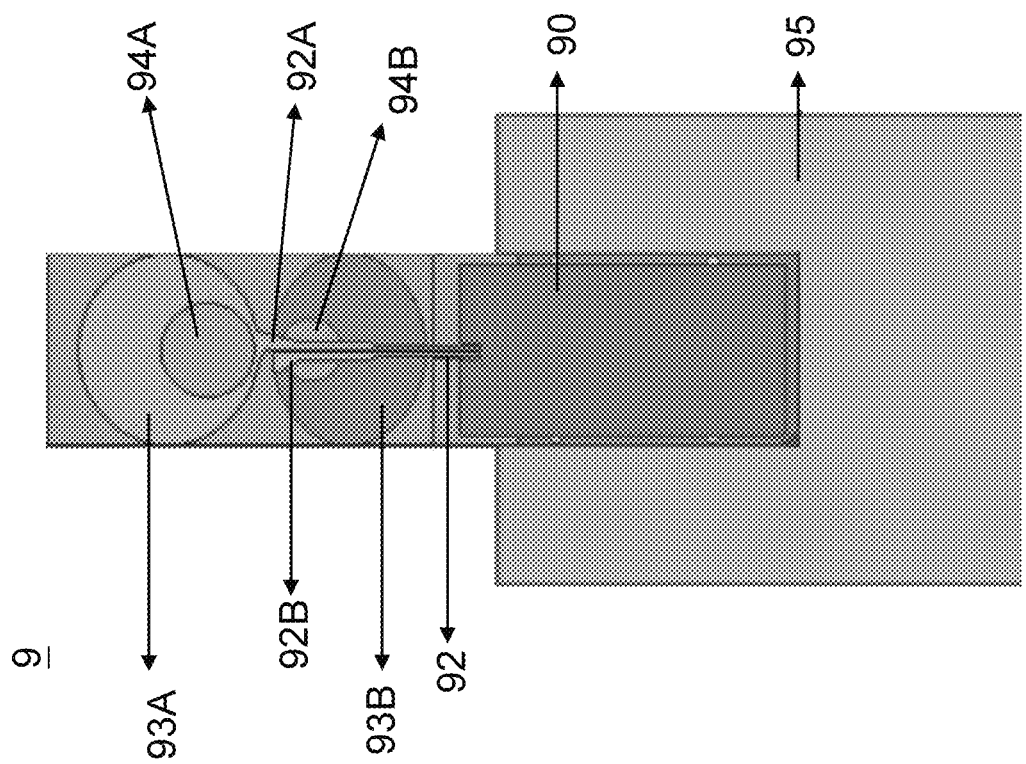
FIG. 9A illustrates a schematic diagram of the antenna device in another embodiment of the invention.

Next, please refer to FIG. 9A. FIG. 9A illustrates a schematic diagram of the antenna device 9 in another embodiment of the invention. As shown in FIG. 9A, the antenna device 9 includes a daughter board 90, a differential line 92, a first metal 93A, a second metal 93B and a motherboard 95. The differential line 92 includes a first line 92A and a second line 92B. The first metal 93A is coupled to the daughter board 90 through the first line 92A. The second metal 93B is coupled to the daughter board 90 through the second line 92B. The daughter board 90 is coupled to the motherboard 95. The shapes and/or the sizes of the first metal 93A and the second metal 93B are different, but not limited to this.

In this embodiment, the first metal 93A and the second metal 93B form an asymmetric dipole, wherein the first metal 93A has a first slot 94A and the second metal 93B has a second Slot 94B. The shapes and sizes of the first metal 93A and the second metal 93B can be the same or different from each other. The shapes and sizes of the first slot 94A and the second slot 94B can be the same or different from each other.

In practical applications, the first metal 93A and the second metal 93B can be formed of the same or different metal materials, but not limited to this; the first metal 93A and the second metal 93B can be disposed on the same plane or on different planes, but not limited to this; the first metal 93A and the second metal 93B can be electrically insulated from each other, but not limited to this; the first metal 93A and the second metal 93B can have a slot or not, but not limited to this.

It should be noted that the daughter board 90 and the motherboard 95 are circuit boards, and the IC packages in the daughter board 90 may have different sizes, such as (3 mm*3 mm) or (5 mm*5 mm), but not limited to this. Since the difference between IC packages of different sizes lies in the position of the RF pins, special consideration should be given to the different RF pin positions of IC packages of different sizes when connecting the antenna device, so the feeding position of the differential line between the two will be also different, but not limited to this.

Figures 9B, 9C:
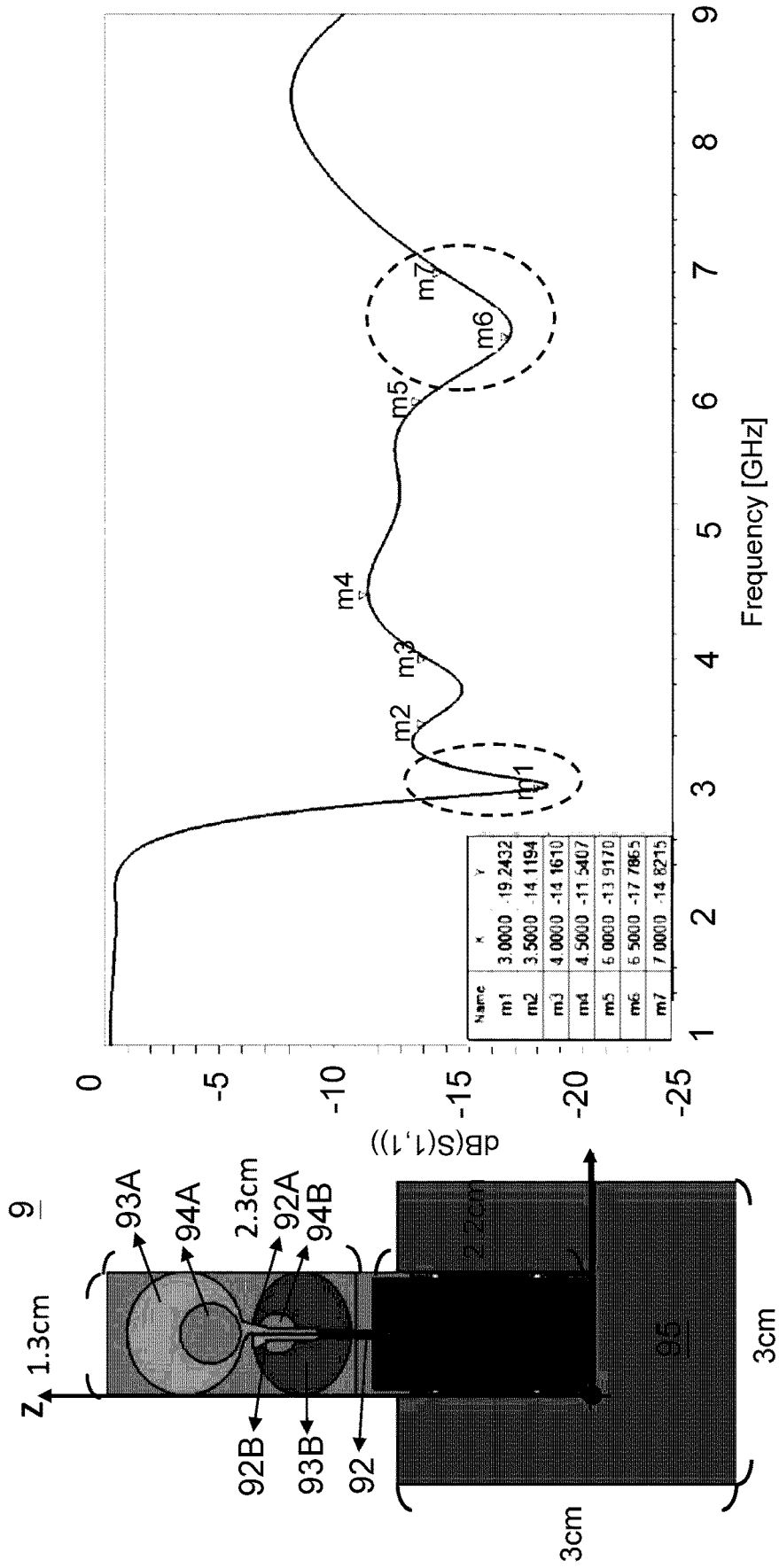
FIG. 9B illustrates an embodiment of the antenna device including a (3 mm*3 mm IC packaged) daughter board having front-end module and a mother board.
FIG. 9C illustrates a graph of impedance bandwidth obtained according to the antenna device of FIG. 9B.
Figure 10B:
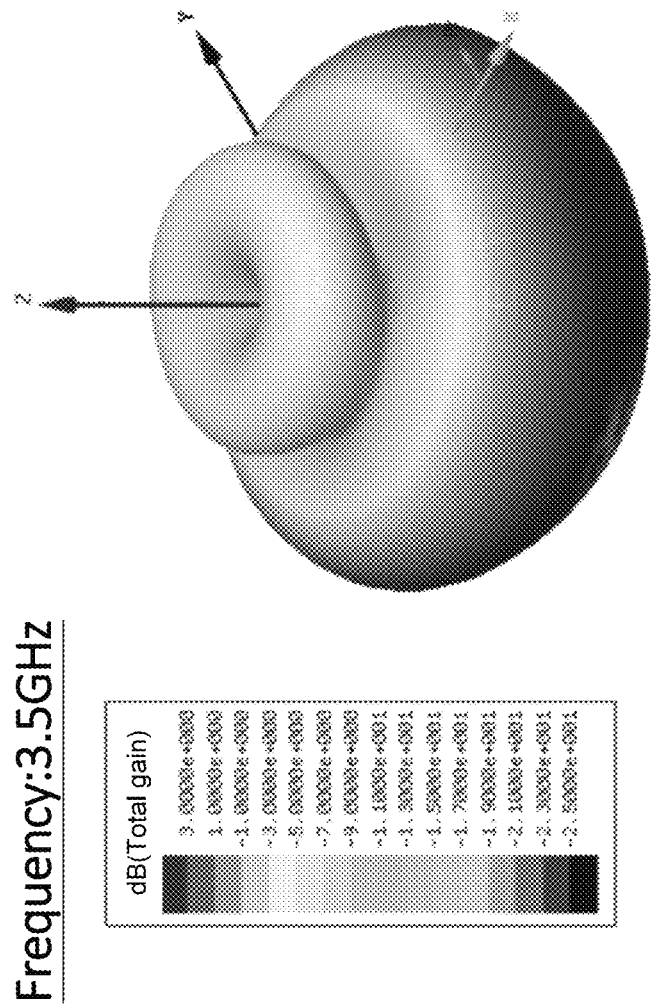
FIG. 10B illustrates a 3-D radiation pattern obtained according to the antenna device of FIG. 9B at a frequency of 3.5 GHz.
Figure 10A:
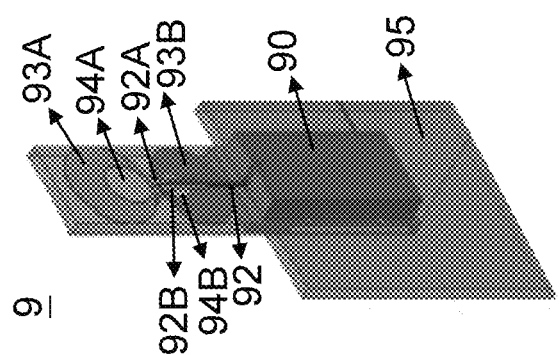
FIG. 10A illustrates a 3-D schematic diagram of the antenna device of FIG. 9B.

Please refer to FIG. 9B, FIG. 9C and FIG. 10A. FIG. 9B illustrates an embodiment of the antenna device including a (3 mm*3 mm IC packaged) daughter board having front-end module and a mother board. FIG. 9C illustrates a graph of impedance bandwidth obtained according to the antenna device of FIG. 9B. FIG. 10A illustrates a 3-D schematic diagram of the antenna device of FIG. 9B. As shown in FIG. 9C, according to the 2-D coordinates of the 2-D coordinates points m1~m7 on the curve, the distribution of the impedance bandwidth can be known, but not limited to this.

Next, the simulation results such as the 3-D radiation pattern and the 2-D radiation pattern obtained according to the antenna device in FIG. 9B at different frequencies will be introduced respectively.

Please refer to FIG. 10B and FIG. 11A to FIG. 11C. FIG. 10B illustrates a 3-D radiation pattern obtained according to the antenna device of FIG. 9B at a frequency of 3.5 GHz. FIG. 11A to FIG. 11C illustrate 2-D radiation patterns obtained according to the antenna device of FIG. 9B at a frequency of 3.5 GHz. According to FIG. 10B and FIG. 11A to FIG. 11C, it can be seen that the simulation results of the 3-D and 2-D radiation directions obtained according to the antenna device of FIG. 9B (coupled to the daughter board having front-end module of the IC package of 3 mm*3 mm and the motherboard) at the frequency of 3.5 GHz are generally good, but not limited to this.

Figure 12:
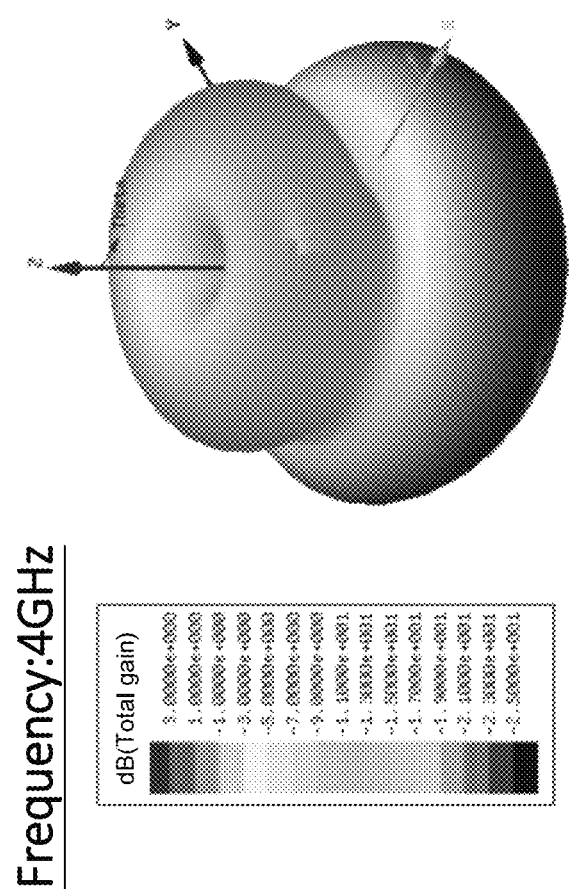
FIG. 12 illustrates a 3-D radiation pattern obtained according to the antenna device of FIG. 9B at a frequency of 4 GHz.
Figures 13A, 13B, 13C:
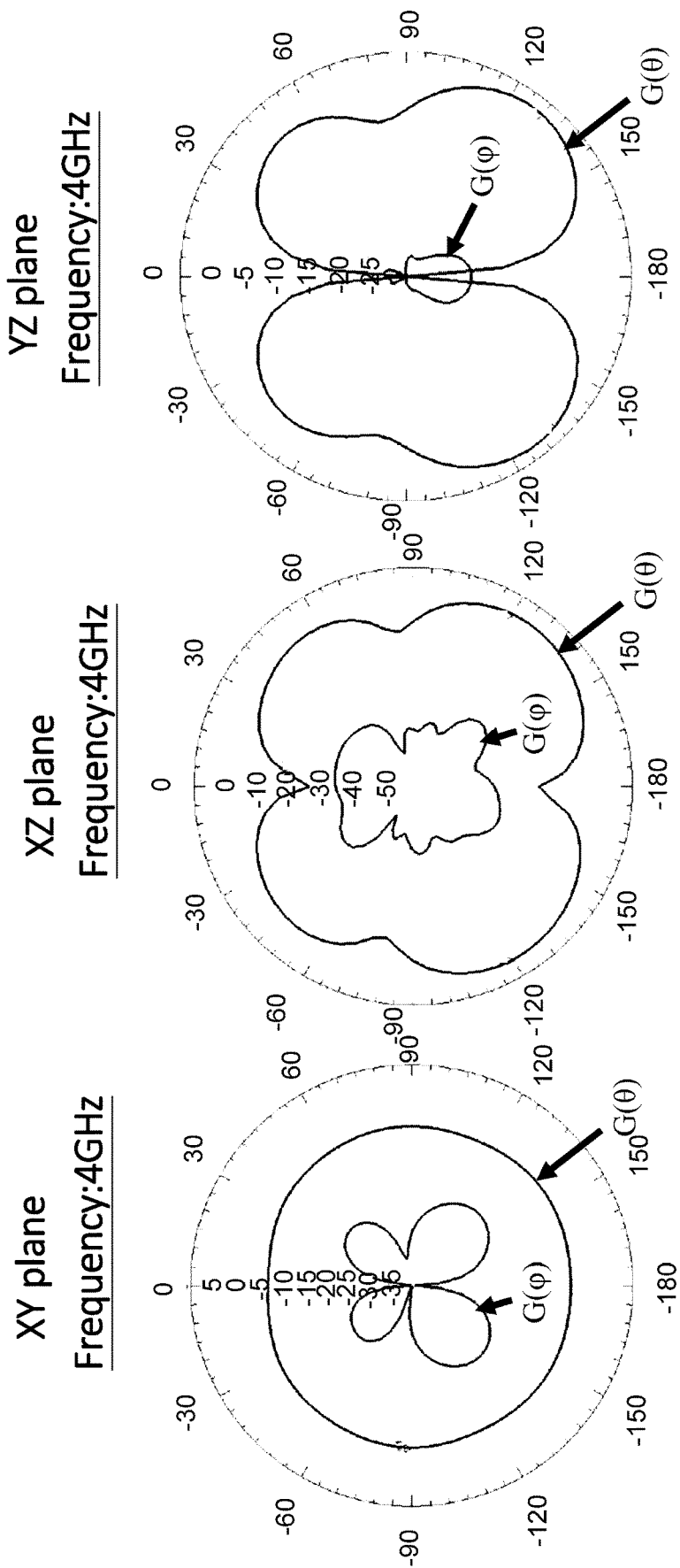
FIG. 13A to FIG. 13C illustrate 2-D radiation patterns obtained according to the antenna device of FIG. 9B at a frequency of 4 GHz.

Please refer to FIG. 12 and FIG. 13A to FIG. 13C. FIG. 12 illustrates a 3-D radiation pattern obtained according to the antenna device of FIG. 9B at a frequency of 4 GHz. FIG. 13A to FIG. 13C illustrate 2-D radiation patterns obtained according to the antenna device of FIG. 9B at a frequency of 4 GHz. According to FIG. 12 and FIG. 13A to FIG. 13C, it can be seen that the simulation results of the 3-D and 2-D radiation directions obtained according to the antenna device of FIG. 9B (coupled to the daughter board having front-end module of the IC package of 3 mm*3 mm and the mother board) at the frequency of 4 GHz are generally good, but not limited to this.

Figure 14:
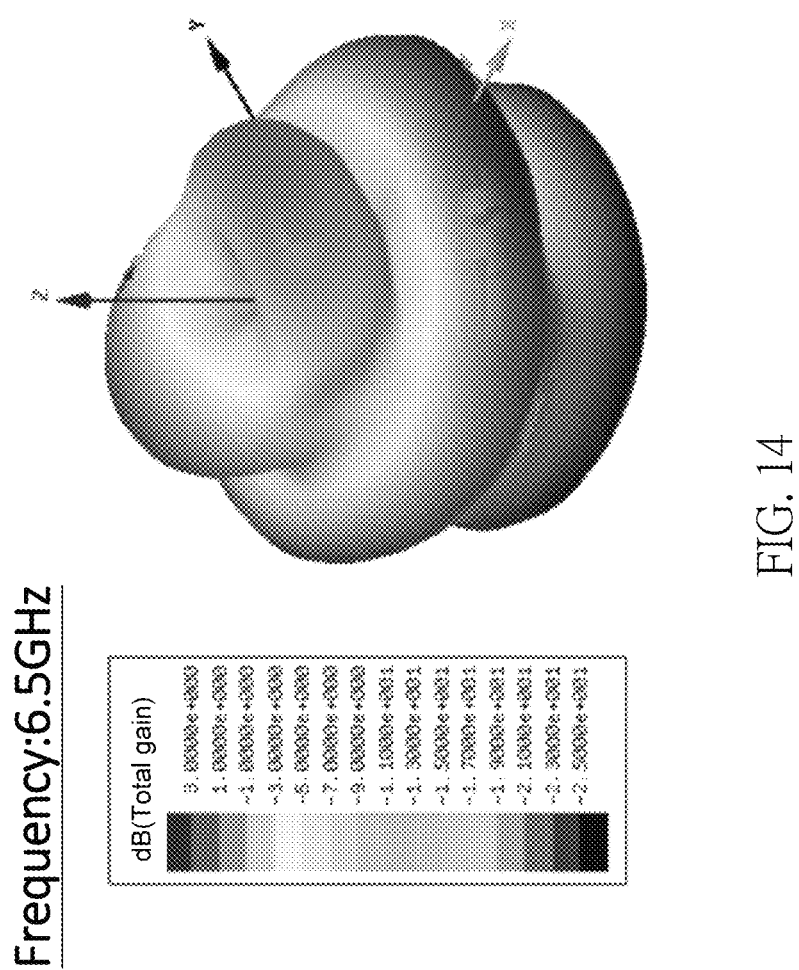
FIG. 14 illustrates a 3-D radiation pattern obtained according to the antenna device of FIG. 9B at a frequency of 6.5 GHz.
Figures 15A, 15B, 15C:
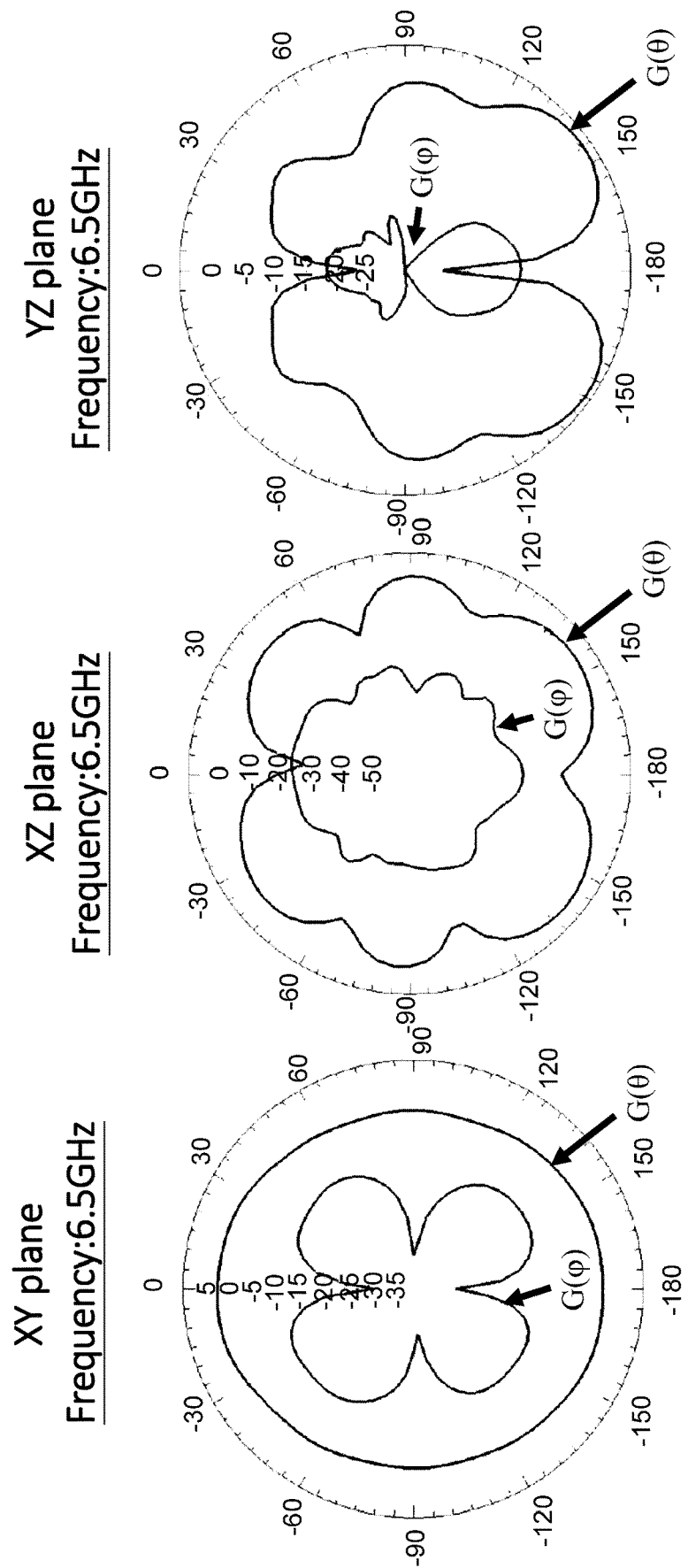
FIG. 15A to FIG. 15C illustrate 2-D radiation patterns obtained according to the antenna device of FIG. 9B at a frequency of 6.5 GHz.

Please refer to FIG. 14 and FIG. 15A to FIG. 15C. FIG. 14 illustrates a 3-D radiation pattern obtained according to the antenna device of FIG. 9B at a frequency of 6.5 GHz. FIG. 15A to FIG. 15C illustrate 2-D radiation patterns obtained according to the antenna device of FIG. 9B at a frequency of 6.5 GHz. According to FIG. 14 and FIG. 15A to FIG. 15C, it can be known that the antenna device of FIG. 9B (coupled to the daughter board having front-end module of the IC package of 3 mm*3 mm and the motherboard) is obtained at the higher frequency of 6.5 GHz. The simulation results of 3-D and 2-D radiation directions are worse than those obtained at lower frequencies (3.5 GHz or 4 GHz), but not limited to this.

Please refer to FIG. 16A, FIG. 16B and FIG. 17A. FIG. 16A illustrates an embodiment of the antenna device including a (5 mm*5 mm IC packaged) daughter board having front-end module and a mother board. FIG. 16B illustrates a graph of impedance bandwidth obtained according to the antenna device of FIG. 16A. FIG. 17A illustrates a 3-D schematic diagram of the antenna device of FIG. 16A. As shown in FIG. 16B, according to the 2-D coordinates of the 2-D coordinate points m1~m9 on the curve, the distribution of the impedance bandwidth can be known, but not limited to this.

Next, the simulation results such as a 3-D radiation pattern and a 2-D radiation pattern obtained according to the antenna device of FIG. 16A at different frequencies will be introduced respectively.

Figures 18A, 18B, 18C:
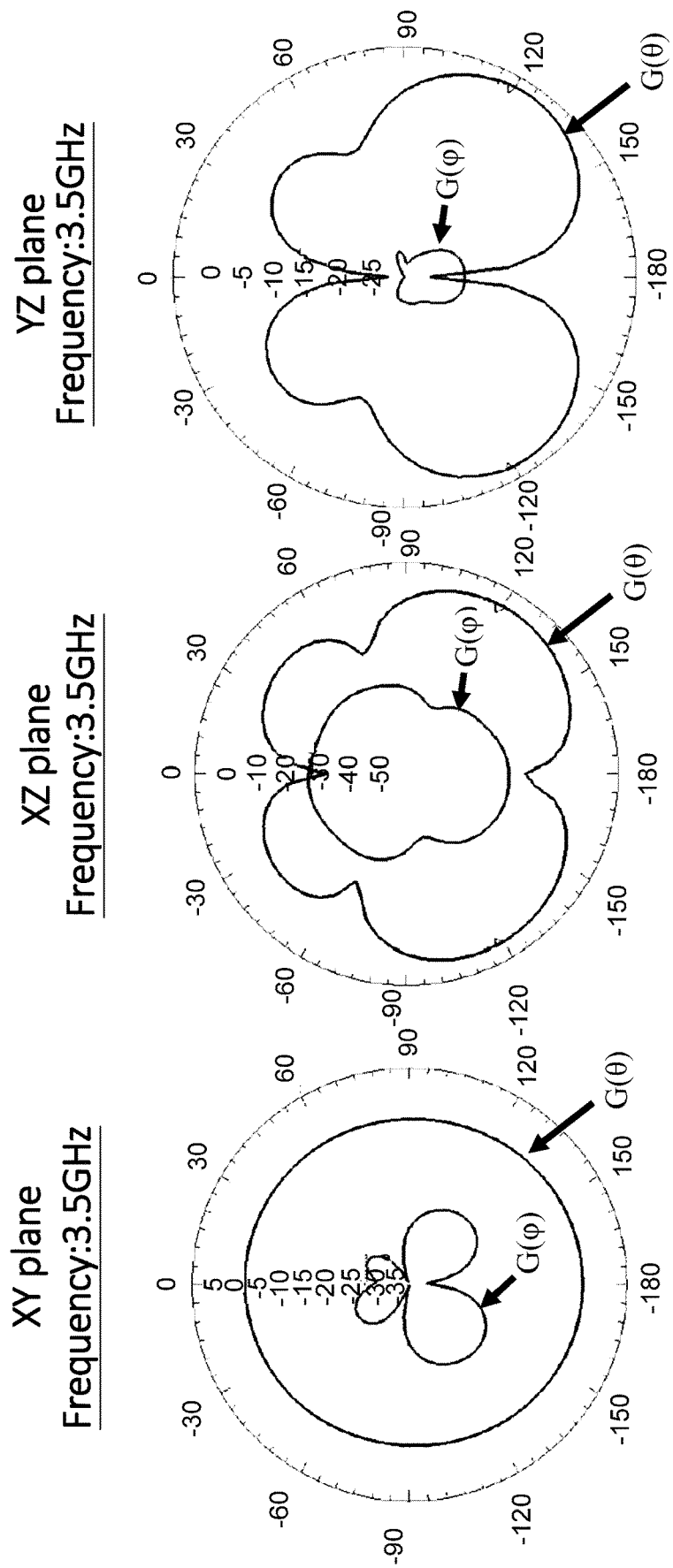
FIG. 18A to FIG. 18C illustrate 2-D radiation patterns obtained according to the antenna device of FIG. 16A at a frequency of 3.5 GHz.

Please refer to FIG. 17B and FIG. 18A to FIG. 18C. FIG. 17B illustrates a 3-D radiation pattern obtained according to the antenna device of FIG. 16A at a frequency of 3.5 GHz. FIG. 18A to FIG. 18C illustrate 2-D radiation patterns obtained according to the antenna device of FIG. 16A at a frequency of 3.5 GHz. According to FIG. 17B and FIG. 18A to FIG. 18C, it can be known that the simulation results of the 3-D and 2-D radiation directions obtained according to the antenna device (coupled to the daughter board having front-end module of the IC package of 5 mm*5 mm and the mother board) of FIG. 16A at the frequency of 3.5 GHz are generally good, but not limited to this.

Figure 19:
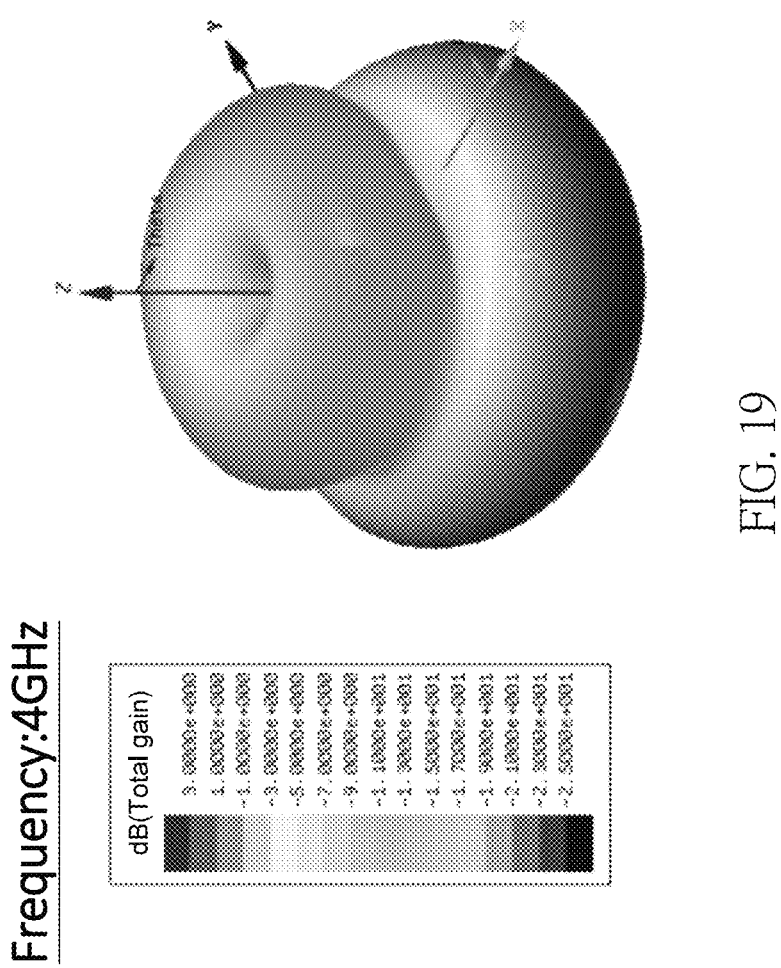
FIG. 19 illustrates a 3-D radiation pattern obtained according to the antenna device of FIG. 16A at a frequency of 4 GHz.
Figures 20A, 20B, 20C:
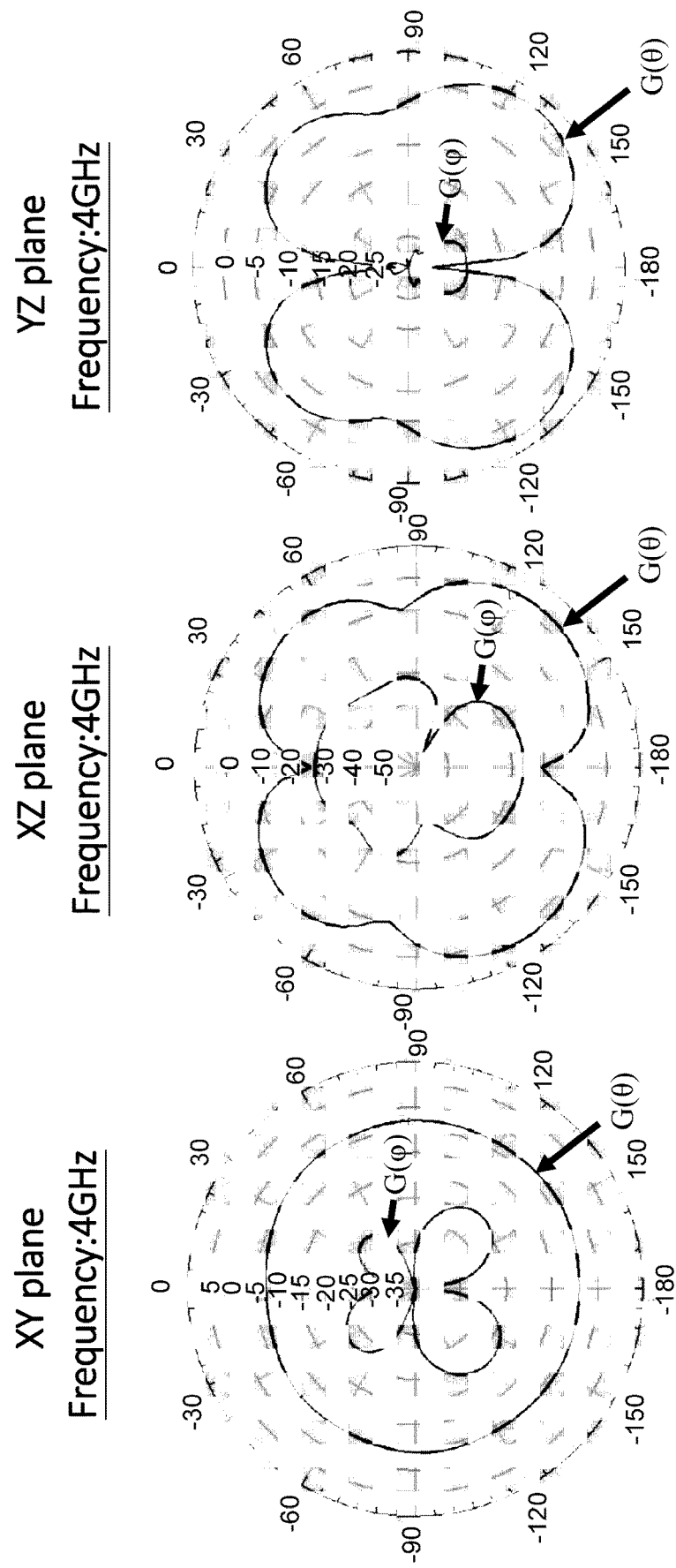
FIG. 20A to FIG. 20C illustrate 2-D radiation patterns obtained according to the antenna device of FIG. 16A at a frequency of 4 GHz.

Please refer to FIG. 19 and FIG. 20A to FIG. 20C. FIG. 19 illustrates a 3-D radiation pattern obtained according to the antenna device of FIG. 16A at a frequency of 4 GHz. FIG. 20A to FIG. 20C illustrate 2-D radiation patterns obtained according to the antenna device of FIG. 16A at a frequency of 4 GHz. According to FIG. 19 and FIG. 20A to FIG. 20C, it can be known that the simulation results of the 3-D and 2-D radiation directions obtained according to the antenna device (coupled to the daughter board having front-end module of the IC package of 5 mm*5 mm and the mother board) of FIG. 16A at the frequency of 4 GHz are generally good, but not limited to this.

Figure 21:
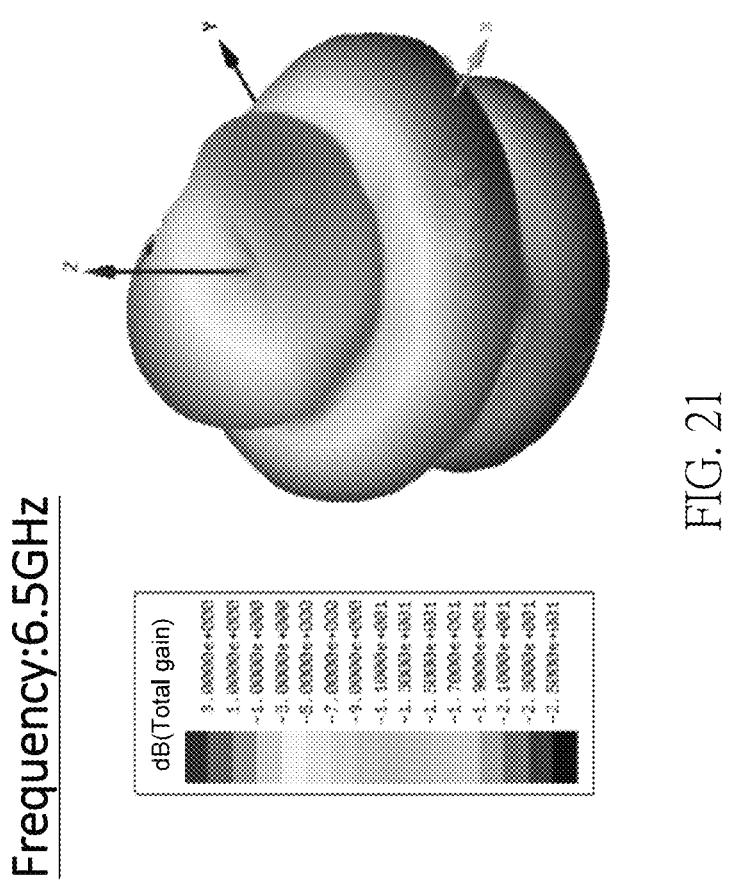
FIG. 21 illustrates a 3-D radiation pattern obtained according to the antenna device of FIG. 16A at a frequency of 6.5 GHz.

Please refer to FIG. 21 and FIG. 22A to FIG. 22C. FIG. 21 illustrates a 3-D radiation pattern obtained according to the antenna device of FIG. 16A at a frequency of 6.5 GHz. FIG. 22A to FIG. 22C illustrate 2-D radiation patterns obtained according to the antenna device of FIG. 16A at a frequency of 6.5 GHz. According to FIG. 21 and FIG. 22A to FIG. 22C, it can be known that simulation results of the 3-D and 2-D radiation directions obtained according to the antenna device (coupled to the daughter board having front-end module of the IC package of 5 mm*5 mm and the motherboard) of FIG. 16A at the higher frequency of 6.5 GHz are worse than those obtained at lower frequencies (3.5 GHz or 4 GHz), but not limited to this.

Figures 23A, 23B:
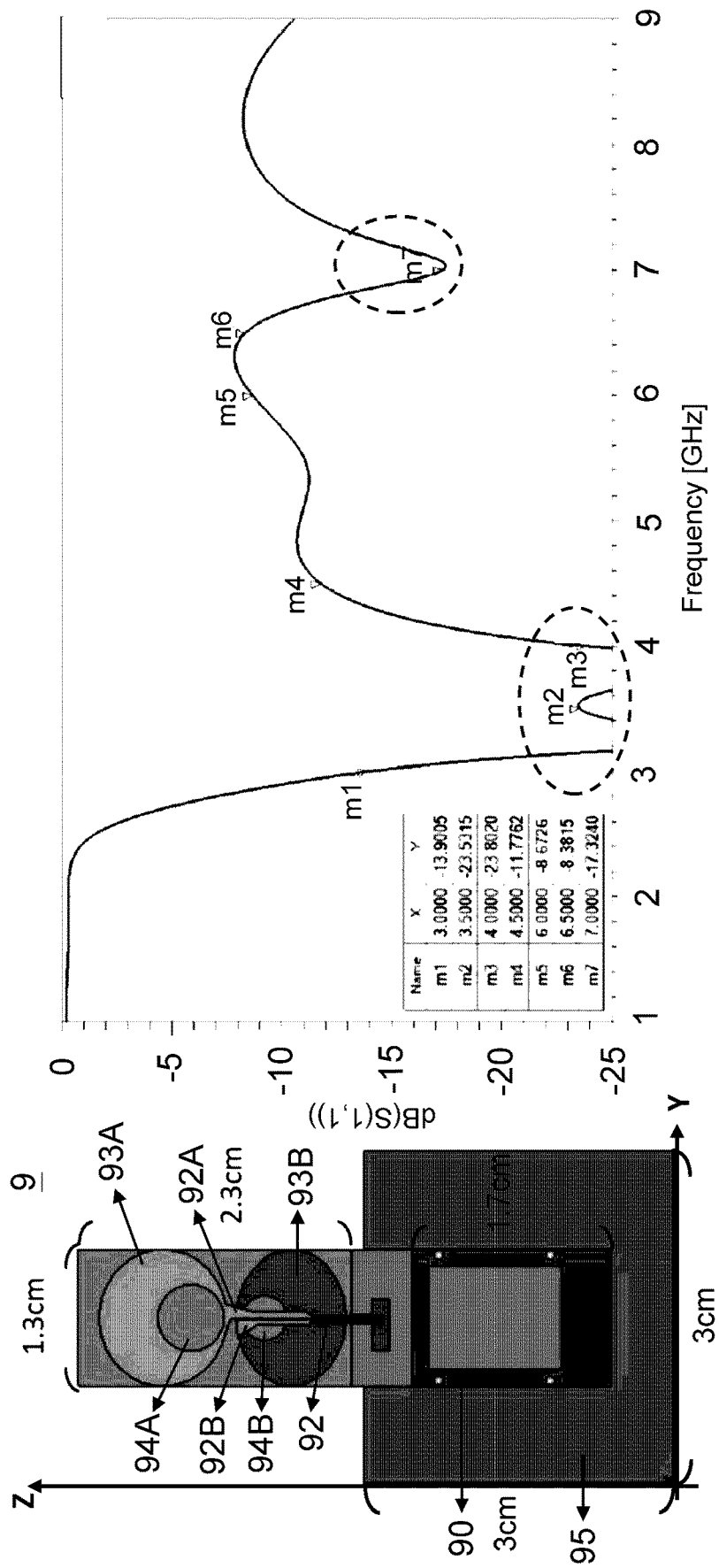
FIG. 23A illustrates an embodiment of the antenna device including a daughter board having no front-end module and a mother board.
FIG. 23B illustrates a graph of impedance bandwidth obtained according to the antenna device of FIG. 23A.

Please refer to FIG. 23A, FIG. 23B and FIG. 24A. FIG. 23A illustrates an embodiment of the antenna device including a daughter board having no front-end module and a mother board. FIG. 23B illustrates a graph of impedance bandwidth obtained according to the antenna device of FIG. 23A. FIG. 24A illustrates a 3-D schematic diagram of the antenna device of FIG. 23A. As shown in FIG. 23B, according to the 2-D coordinates of the 2-D coordinate points m1~m7 on the curve, the distribution of the impedance bandwidth can be known, but not limited to this.

Next, the simulation results such as a 3-D radiation pattern and a 2-D radiation pattern obtained according to the antenna device of FIG. 23A at different frequencies will be introduced respectively.

Figures 25A, 25B, 25C:
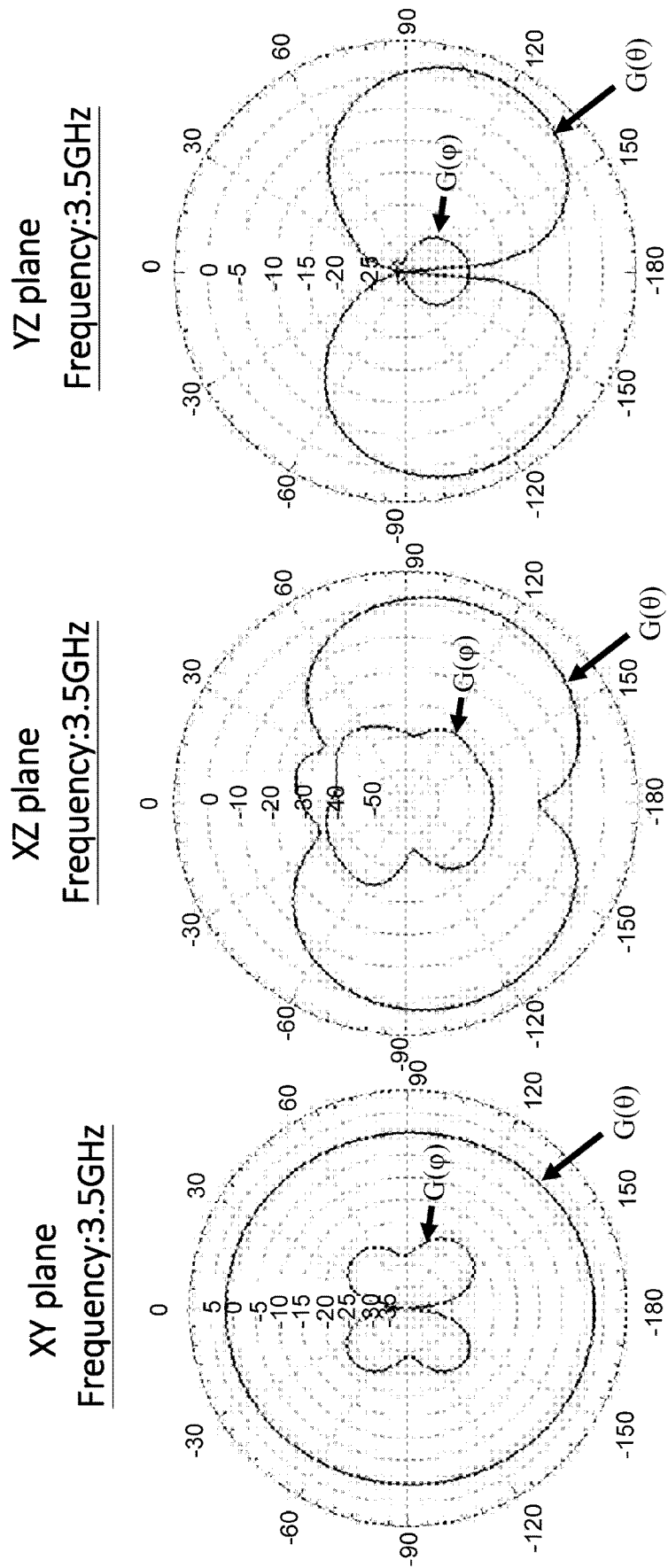
FIG. 25A to FIG. 25C illustrate 2-D radiation patterns obtained according to the antenna device of FIG. 23A at a frequency of 3.5 GHz.

Please refer to FIG. 24B and FIG. 25A to FIG. 25C. FIG. 24B illustrates a 3-D radiation pattern obtained according to the antenna device of FIG. 23A at a frequency of 3.5 GHz. FIG. 25A to FIG. 25C illustrate 2-D radiation patterns obtained according to the antenna device of FIG. 23A at a frequency of 3.5 GHz. According to FIG. 24B and FIG. 25A to FIG. 25C, it can be known that the simulation results of the 3-D and 2-D radiation directions obtained by the antenna device (coupled to the daughter board having front-end module and the mother board) of FIG. 23A at the frequency of 3.5 GHz are generally good, but not limited to this.

Figure 26:
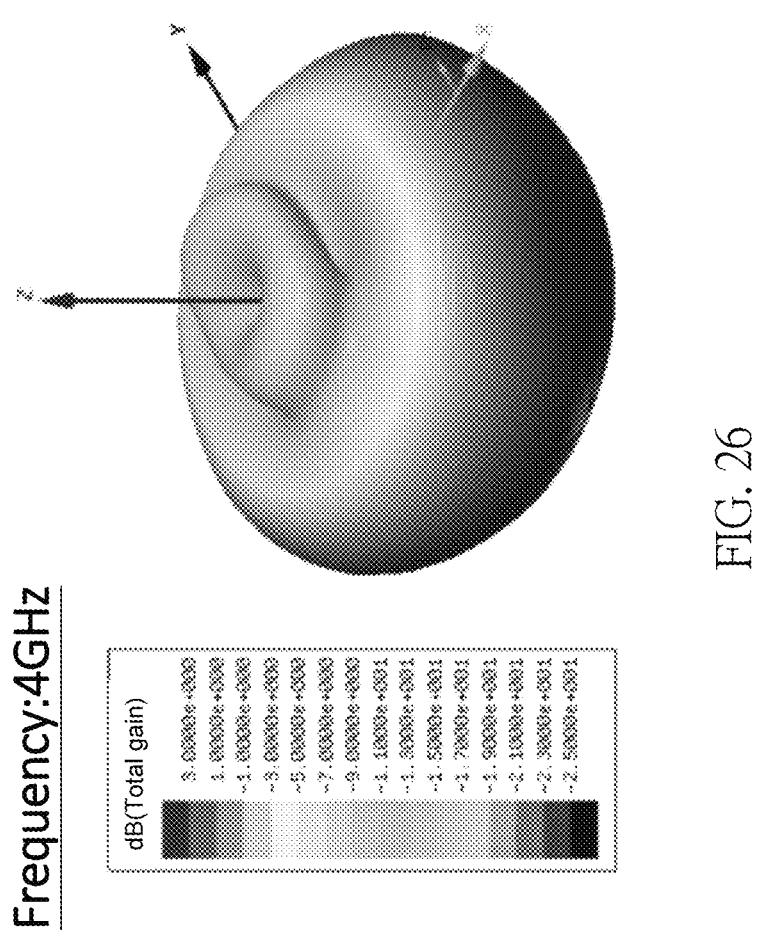
FIG. 26 illustrates a 3-D radiation pattern obtained according to the antenna device of FIG. 23A at a frequency of 4 GHz.
Figures 27A, 27B, 27C:
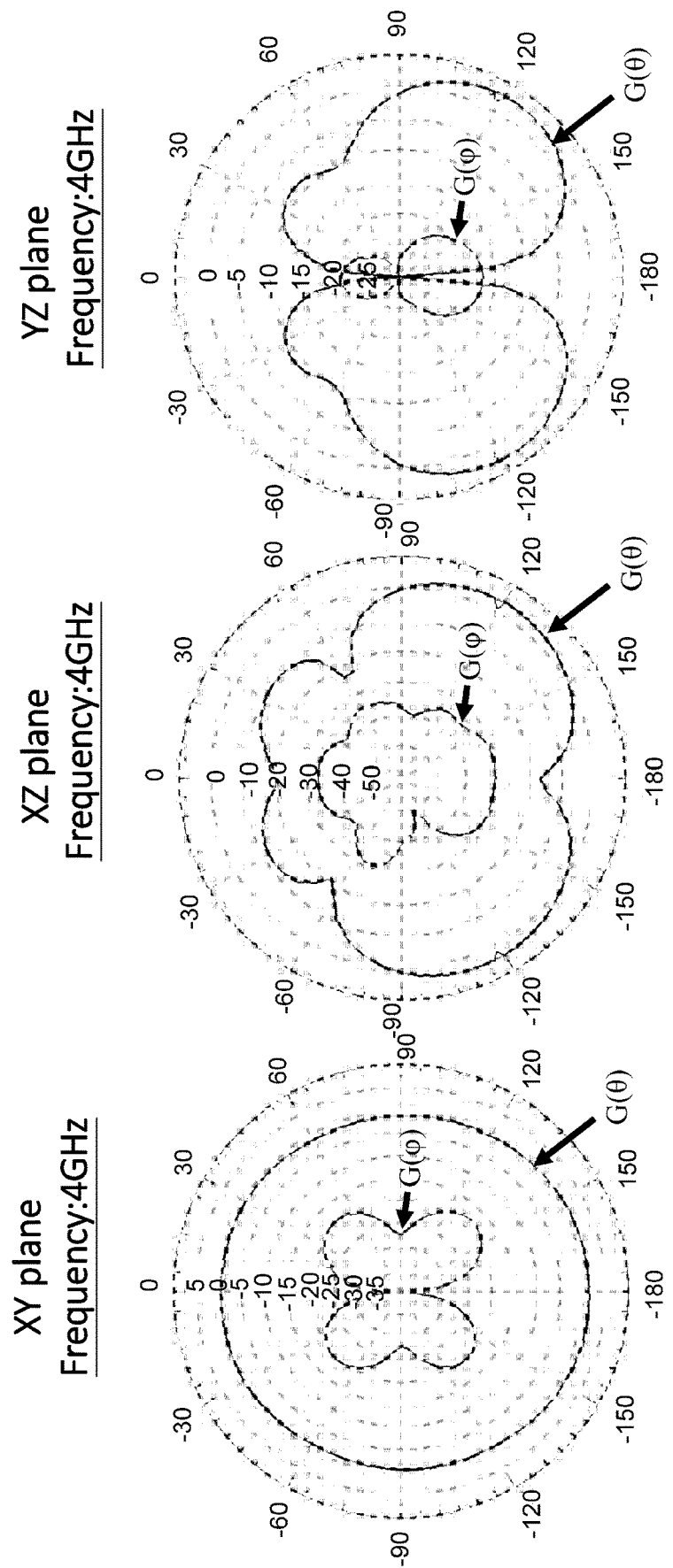
FIG. 27A to FIG. 27C illustrate 2-D radiation patterns obtained according to the antenna device of FIG. 23A at a frequency of 4 GHz.

Please refer to FIG. 26 and FIG. 27A to FIG. 27C. FIG. 26 illustrates a 3-D radiation pattern obtained according to the antenna device of FIG. 23A at a frequency of 4 GHz. FIG. 27A to FIG. 27C illustrate 2-D radiation patterns obtained according to the antenna device of FIG. 23A at a frequency of 4 GHz. According to FIG. 26 and FIG. 27A to FIG. 27C, it can be known that the simulation results of the 3-D and 2-D radiation directions obtained according to the antenna device (coupled to the daughter board having front-end module and the mother board) of FIG. 23A at the frequency of 4 GHz are generally good, but not limited to this.

Figure 28:
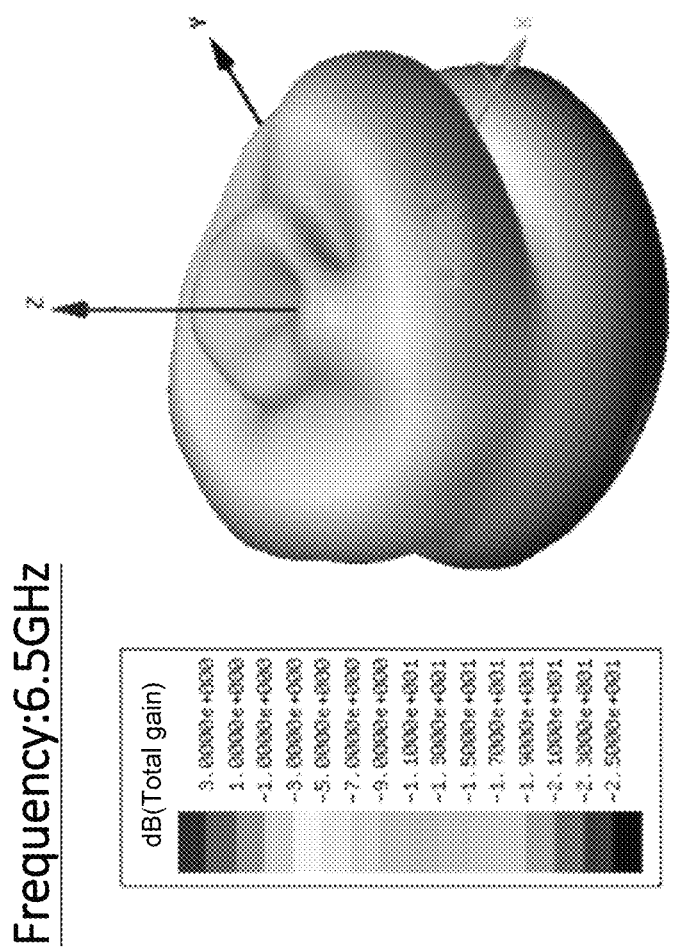
FIG. 28 illustrates a 3-D radiation pattern obtained according to the antenna device of FIG. 23A at a frequency of 6.5 GHz.

Please refer to FIG. 28 and FIG. 29A to FIG. 29C. FIG. 28 illustrates a 3-D radiation pattern obtained according to the antenna device of FIG. 23A at a frequency of 6.5 GHz.

Figures 29A, 29B, 29C:
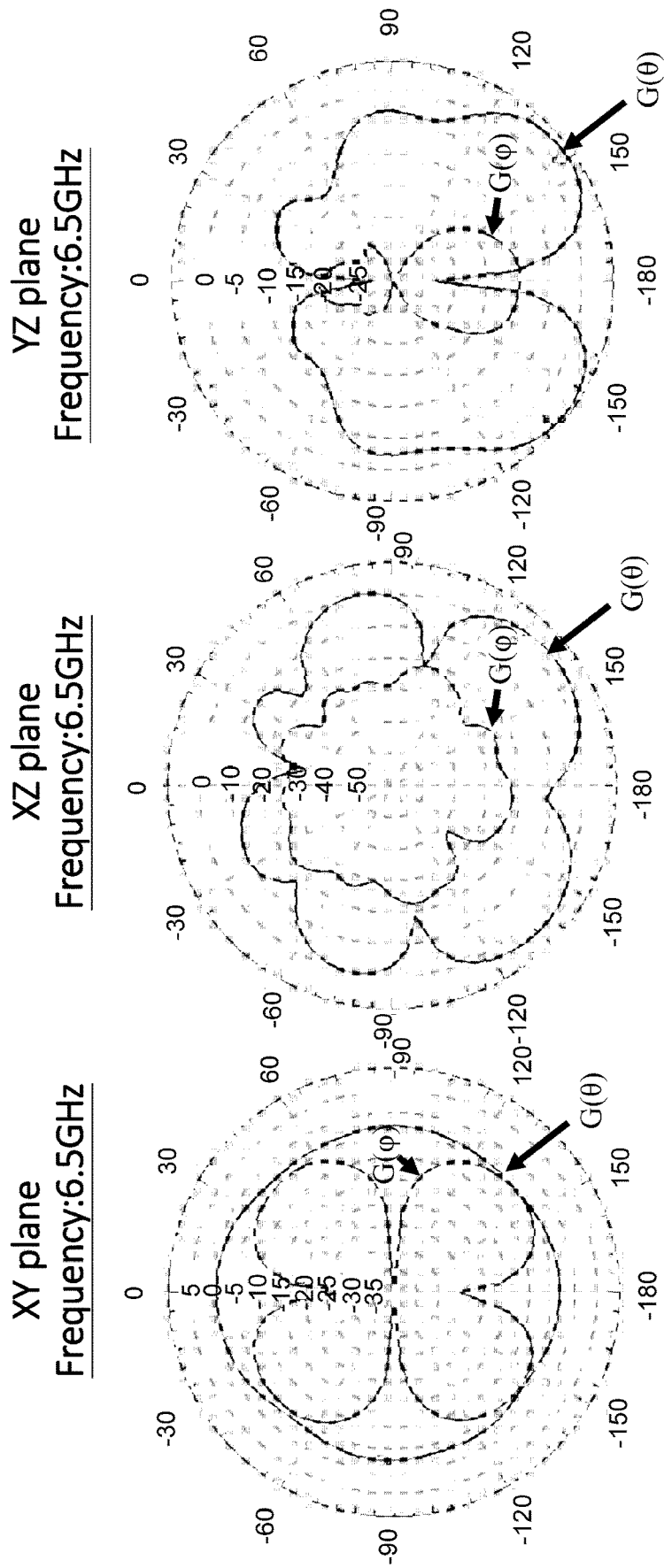
FIG. 29A to FIG. 29C illustrate 2-D radiation patterns obtained according to the antenna device of FIG. 23A at a frequency of 6.5 GHz.

FIG. 29A to FIG. 29C illustrate 2-D radiation patterns obtained according to the antenna device of FIG. 23A at a frequency of 6.5 GHz. According to FIG. 28 and FIG. 29A to FIG. 29C, it can be known that the simulation results of the 3-D and 2-D radiation directions obtained according to the antenna device (coupled to the daughter board having front-end module and the mother board) of FIG. 23A at the higher frequency of 6.5 GHz are worse than those obtained at lower frequency (3.5 GHz or 4 GHz), but they should be better than the simulation results obtained according to the antenna device (coupled to the daughter board having front-end module of IC package 3 mm*3 mm and the motherboard) of FIG. 9B and the antenna device (coupled to the daughter board having front-end module of IC package 5 mm*5 mm and the motherboard) of FIG. 16A at the frequency of 6.5 GHz, but not limited to this.

Figures 30A, 30B:
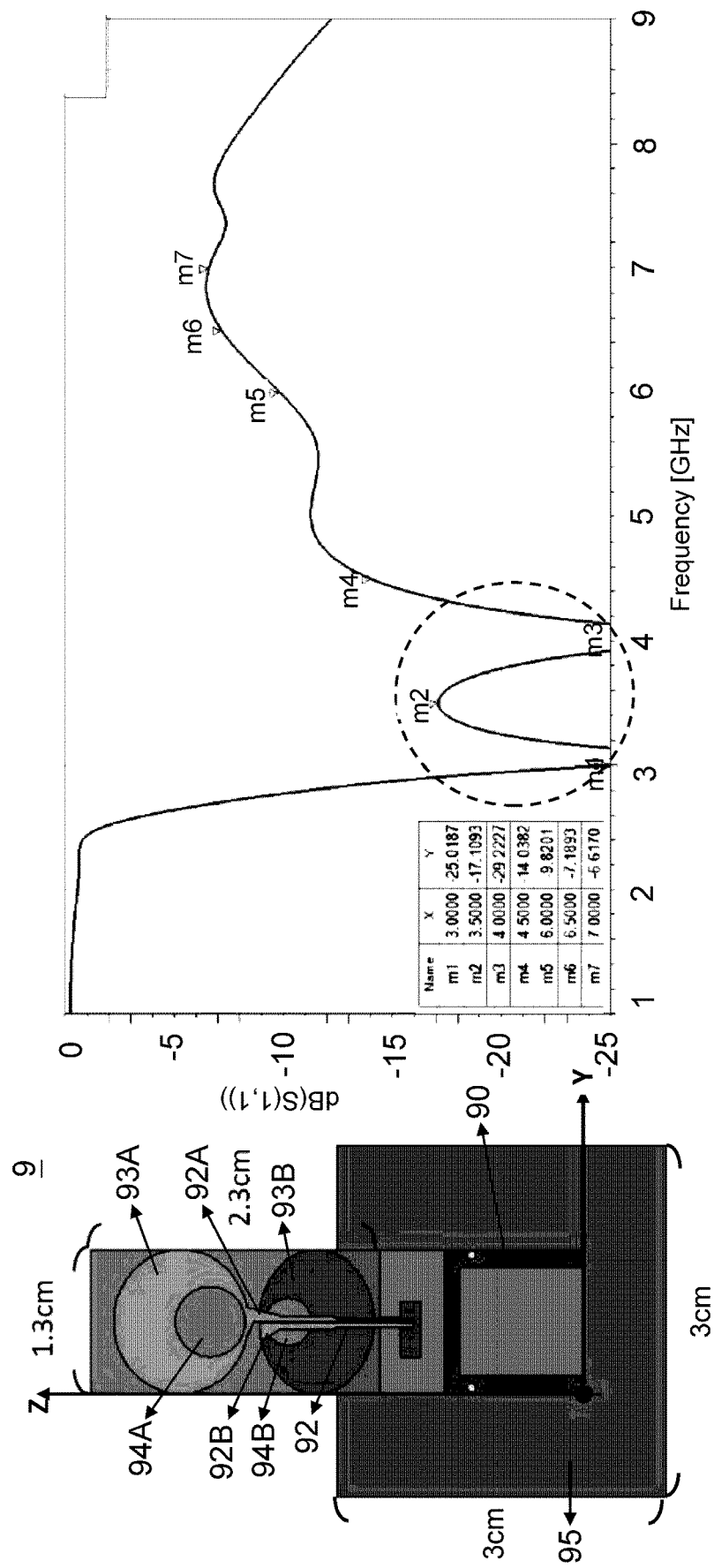
FIG. 30A illustrates an embodiment that the antenna device includes an offset daughter board having no front-end module and a mother board.
FIG. 30B illustrates a graph of impedance bandwidth obtained according to the antenna device of FIG. 30A.

Please refer to FIG. 30A and FIG. 30B. FIG. 30A illustrates an embodiment that the antenna device includes an offset daughter board having no front-end module and a mother board. FIG. 30B illustrates a graph of impedance bandwidth obtained according to the antenna device of FIG. 30A. As shown in FIG. 30B, according to the 2-D coordinates of the 2-D coordinate points m1~m7 on the curve, the distribution of the impedance bandwidth can be known, but not limited to this.

Next, the simulation results of the 3-D radiation pattern and the 2-D radiation pattern obtained by the antenna device of FIG. 30A at different frequencies will be introduced respectively.

Figure 31:
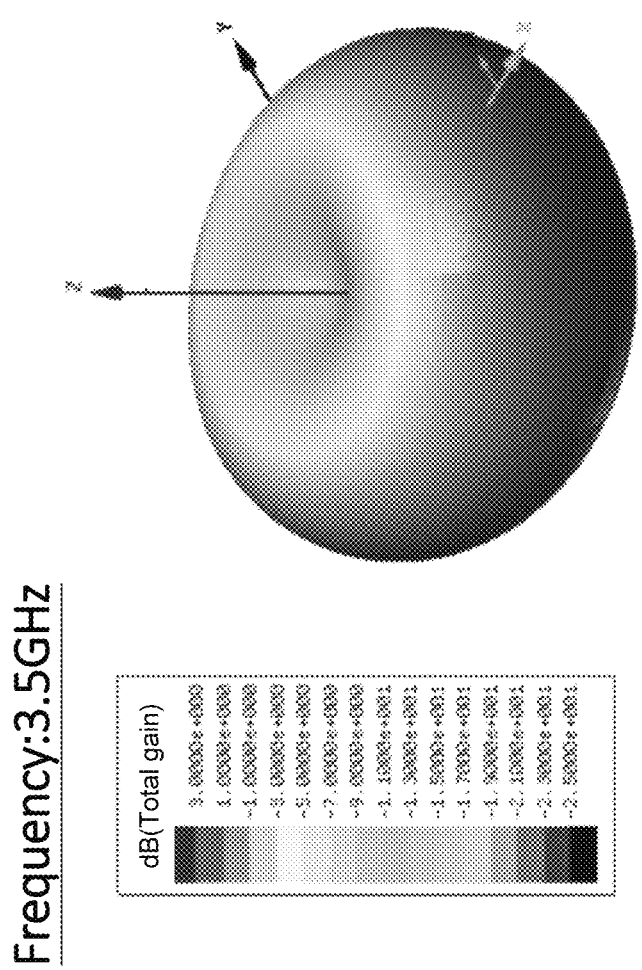
FIG. 31 illustrates a 3-D radiation pattern obtained according to the antenna device of FIG. 30A at a frequency of 3.5 GHz.
Figure 32:
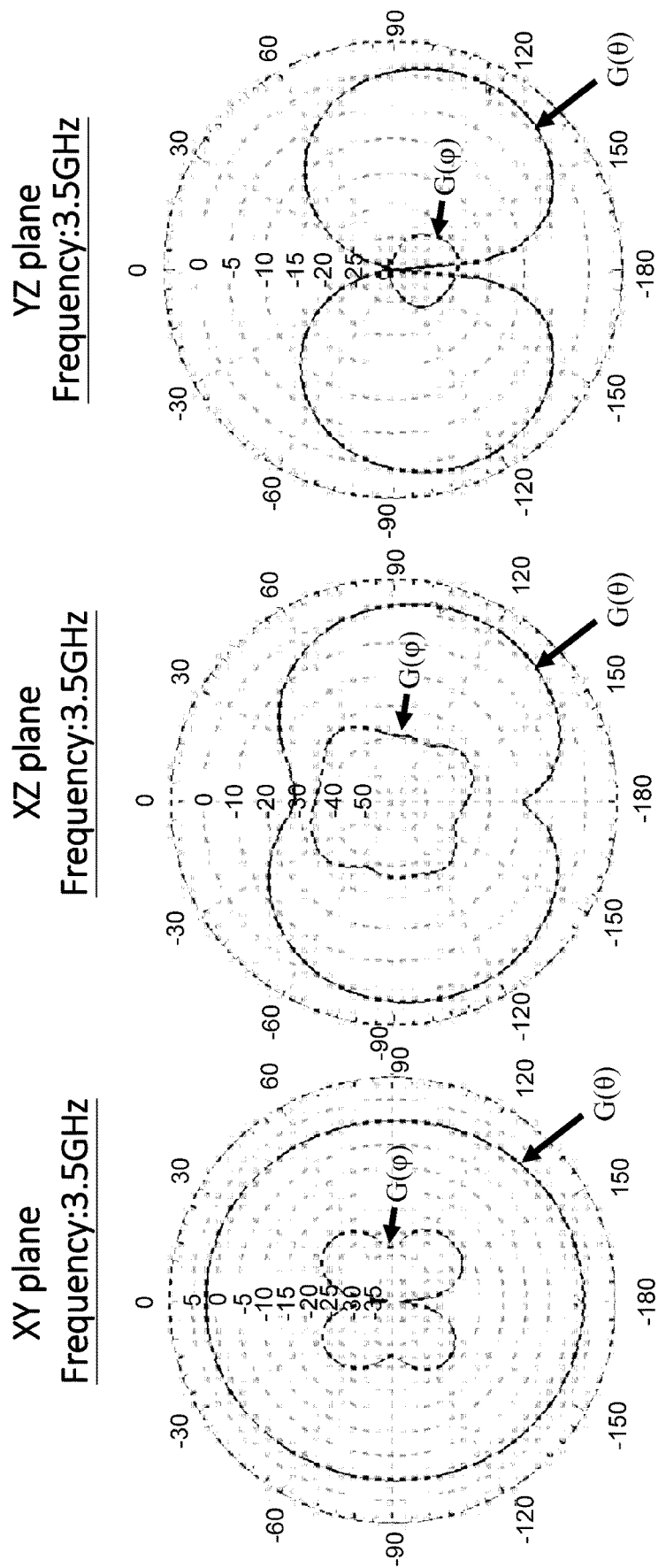
FIG. 32A to FIG. 32C illustrate 2-D radiation patterns obtained according to the antenna device of FIG. 30A at a frequency of 3.5 GHz.

Please refer to FIG. 31 and FIG. 32A to FIG. 32C. FIG. 31 illustrates a 3-D radiation pattern obtained according to the antenna device of FIG. 30A at a frequency of 3.5 GHz. FIG. 32A to FIG. 32C illustrate 2-D radiation patterns obtained according to the antenna device of FIG. 30A at a frequency of 3.5 GHz. According to FIG. 31 and FIG. 32A to FIG. 32C, it can be known that the simulation results of the 3-D and 2-D radiation directions obtained according to the antenna device (coupled the offset daughter board having no front-end module and the mother board) of FIG. 30A at the frequency of 3.5 GHz are generally good, but not limited to this.

Figure 33:
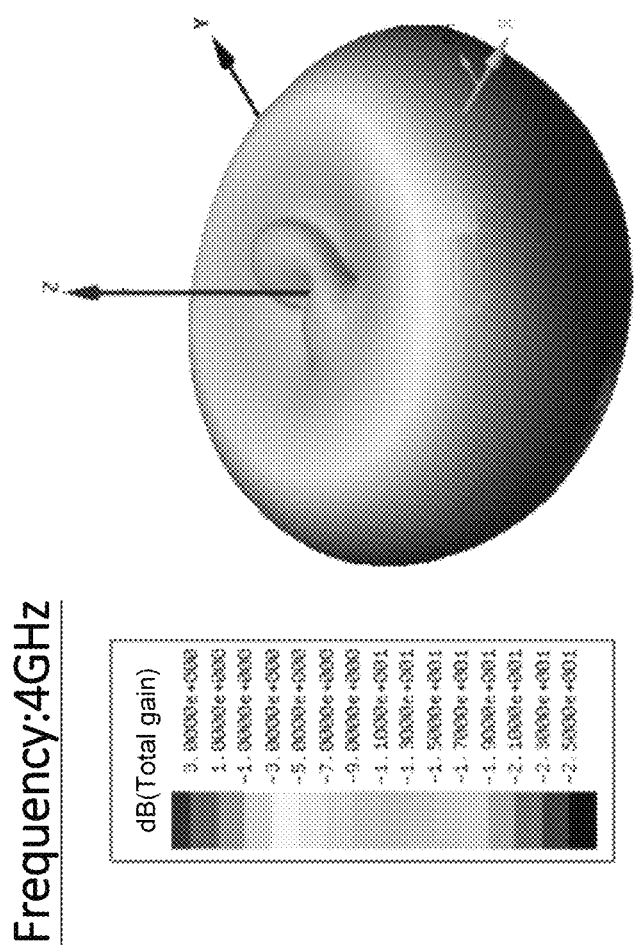
FIG. 33 illustrates a 3-D radiation pattern obtained according to the antenna device of FIG. 30A at a frequency of 4 GHz.
Figures 34A, 34B, 34C:
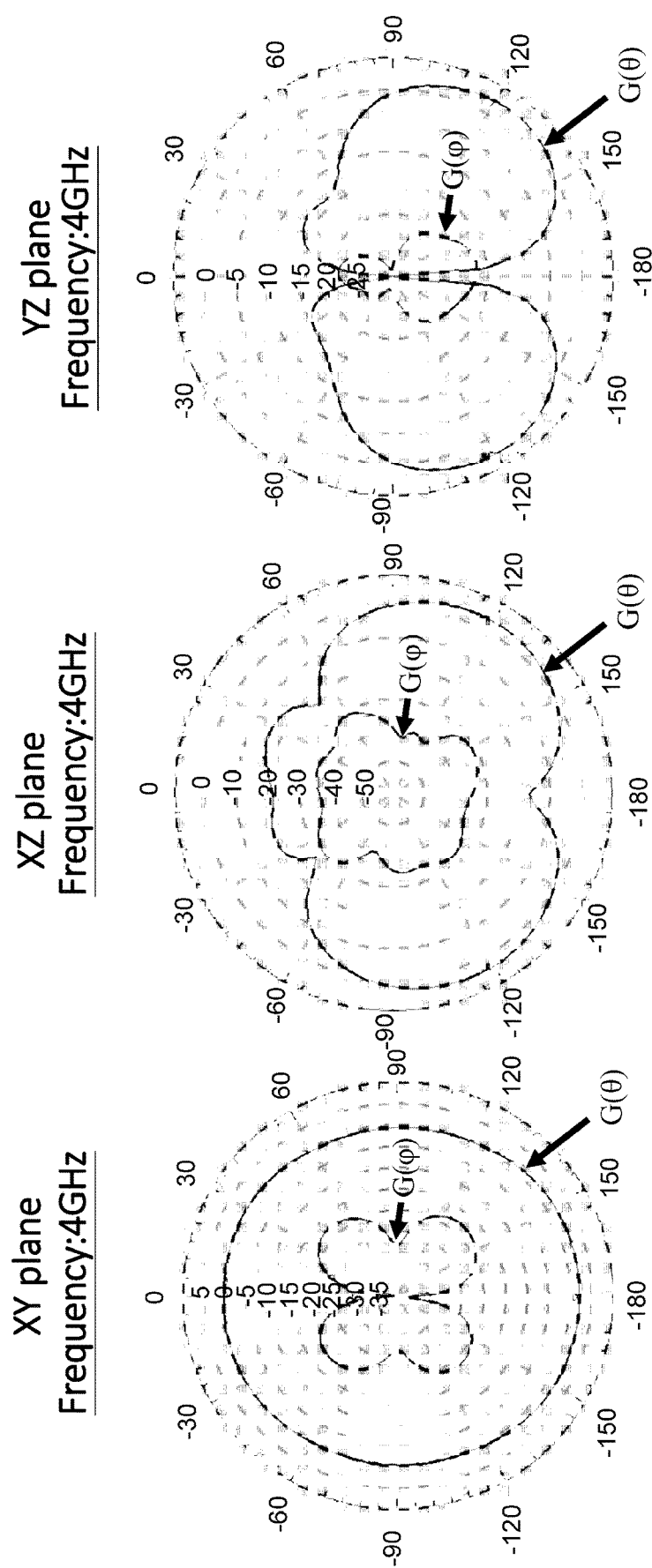
FIG. 34A to FIG. 34C illustrate 2-D radiation patterns obtained according to the antenna device of FIG. 30A at a frequency of 4 GHz.

Please refer to FIG. 33 and FIG. 34A to FIG. 34C. FIG. 33 illustrates a 3-D radiation pattern obtained according to the antenna device of FIG. 30A at a frequency of 4 GHz. FIG. 34A to FIG. 34C illustrate 2-D radiation patterns obtained according to the antenna device of FIG. 30A at a frequency of 4 GHz. According to FIG. 33 and FIG. 34A to FIG. 34C, it can be seen that the simulation results of the 3-D and 2-D radiation directions obtained by the antenna device (coupled to the offset daughter board having no front-end module and the mother board) of FIG. 30A at the frequency of 4 GHz are generally good, but not limited to this.

Figure 35:
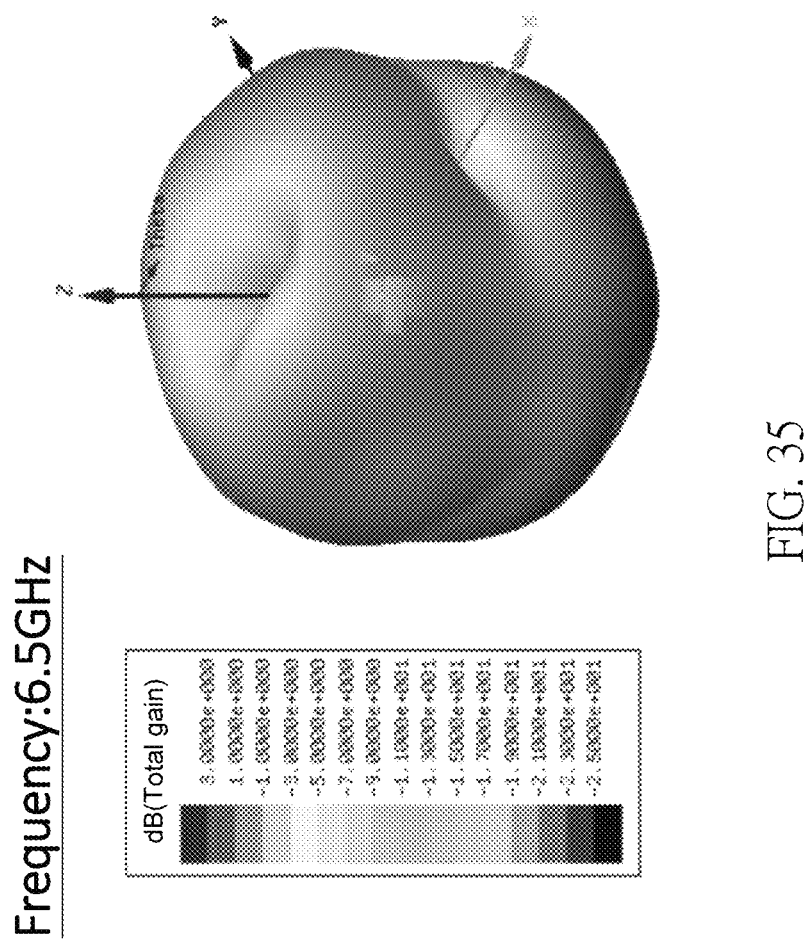
FIG. 35 illustrates a 3-D radiation pattern obtained according to the antenna device of FIG. 30A at a frequency of 6.5 GHz.
Figures 36A, 36B, 36C:
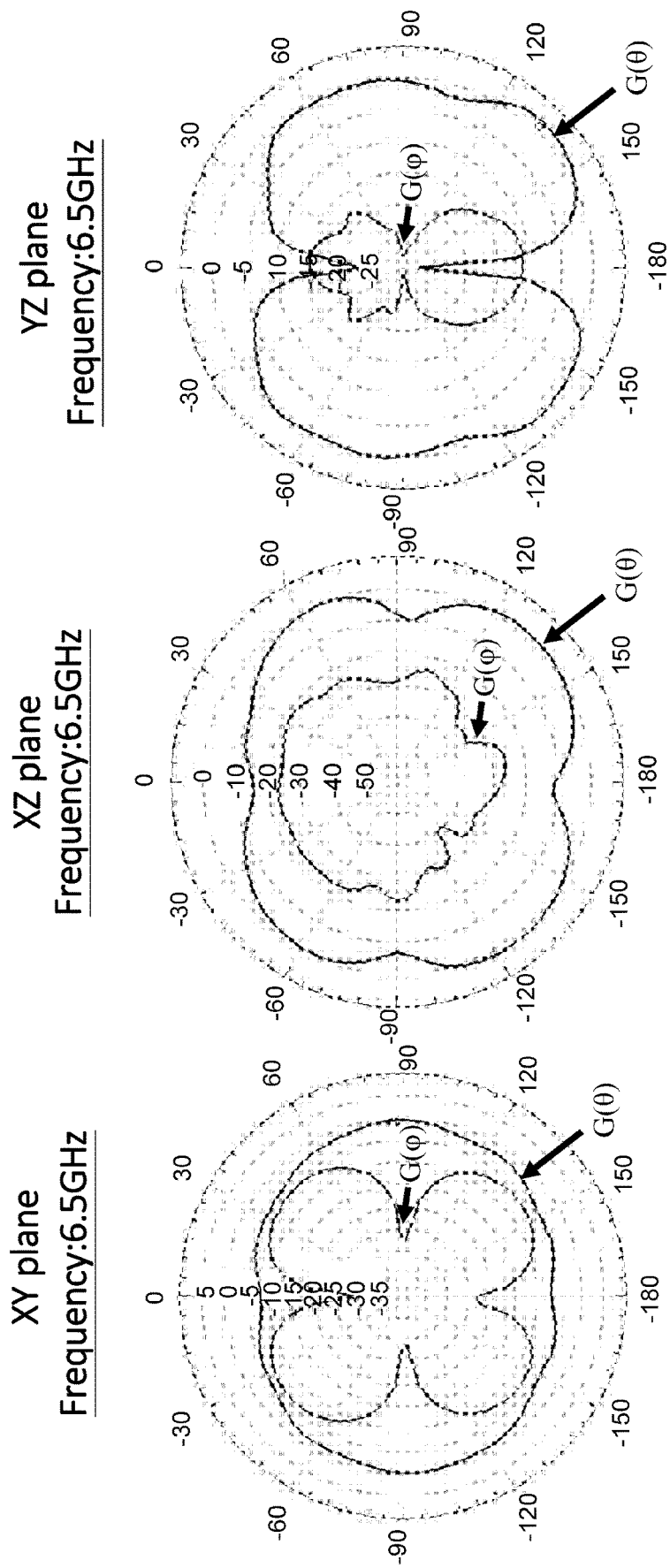
FIG. 36A to FIG. 36C illustrate 2-D radiation patterns obtained according to the antenna device of FIG. 30A at a frequency of 6.5 GHz.

Please refer to FIG. 35 and FIG. 36A to FIG. 36C. FIG. 35 illustrates a 3-D radiation pattern obtained according to the antenna device of FIG. 30A at a frequency of 6.5 GHz. FIG. 36A to FIG. 36C illustrate 2-D radiation patterns obtained according to the antenna device of FIG. 30A at a frequency of 6.5 GHz. According to FIG. 35 and FIG. 36A to FIG. 36C, it can be known that the simulation results of the 3-D and 2-D radiation directions obtained according to the antenna device (coupled the offset daughter board having no front-end module and the mother board) of FIG. 30A at the frequency of 6.5 GHz are obvious better than the simulation results obtained according to the antenna devices of the above-mentioned embodiments at the frequency of 6.5 GHz, but not limited to this.

It should be noted that, whether the antenna device can obtain better simulation results at different frequencies actually needs to consider the overall antenna characteristics, including impedance matching and radiation pattern, etc., but not limited to this. In addition, when the daughter board having no front-end module is coupled to the mother board, the preferred offset distance of the above-mentioned daughter board having no front-end module is such that there is no motherboard under the first metal and the second metal, but not limited to this.

Although the above embodiments are all described with an antenna device including two metals, in fact, the antenna device of the invention can also include three metals or even more metals, which is not limited to the above embodiments. In addition, all the metals included in the antenna device of the invention can be made of the same or different metal materials, arranged on the same plane or different planes, have different shapes and/or different sizes, and there is no specific limitation.

Compared to the prior art, the antenna device proposed in the invention is a symmetric dipole or asymmetric dipole antenna device with an ultra-wideband (UWB) wireless signal receiving function. Because the UWB wireless signal has the advantages of high positioning accuracy (centimeter level), high security, low power consumption, etc., it can be applied to various new types of wireless positioning applications (such as mobile payment, digital signage orientation, etc.) and provides good wireless positioning function to effectively solve the problems encountered by the previous technology.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An antenna device, comprising:
   a differential-line, comprising a first line and a second line;
   a first metal, coupled to the first line; and
   a second metal, coupled to the second line;
   wherein the first metal and the second metal have different shapes and/or different sizes, the first metal and the second metal form an asymmetric dipole, the first metal has a first circular slot disposed therein and the second metal has a second circular slot disposed therein, and sizes of the first circular slot and the second circular slot are different.

2. The antenna device of claim 1, wherein the first metal and the second metal are disposed on the same plane.

3. The antenna device of claim 1, wherein the first metal and the second metal are disposed on different planes.

4. The antenna device of claim 1, wherein the first metal and the second metal are electrically insulated.

5. The antenna device of claim 1, wherein the antenna device further comprises a base coupled to the first line and the second line.

6. The antenna device of claim 5, wherein the base is a daughter board.

7. The antenna device of claim 6, wherein the daughter board has a front-end module.

8. The antenna device of claim 6, wherein the daughter board has no front-end module.

9. The antenna device of claim 6, wherein an IC package in the daughter board has different sizes.

10. The antenna device of claim 6, wherein the daughter board is offset by different distances.

11. The antenna device of claim 6, wherein the daughter board is coupled to a mother board.

* * * * *